(12) United States Patent
Silberberg et al.

(10) Patent No.: US 7,035,484 B2
(45) Date of Patent: Apr. 25, 2006

(54) TUNABLE OPTICAL FILTER

(75) Inventors: Yaron Silberberg, Lehavim (IL); Seongwoo Suh, Florham Park, NJ (US); Gil Cohen, Livingston, NJ (US)

(73) Assignee: Xtellus, Inc., Florham Park, NJ (US)

( * ) Notice: Subject to any disclaimer, the term of this patent is extended or adjusted under 35 U.S.C. 154(b) by 314 days.

(21) Appl. No.: 10/120,562

(22) Filed: Apr. 12, 2002

(65) Prior Publication Data
US 2003/0194165 A1    Oct. 16, 2003

(51) Int. Cl.
*G02F 1/01* (2006.01)
*G02F 1/295* (2006.01)

(52) U.S. Cl. ............................................. 385/1; 385/4

(58) Field of Classification Search ................ 359/189, 359/192, 285, 308, 300, 313, 314; 385/1, 385/4, 11
See application file for complete search history.

(56) References Cited

U.S. PATENT DOCUMENTS

| | | | |
|---|---|---|---|
| 4,239,329 A | 12/1980 | Matsumoto | 350/96.15 |
| 4,364,639 A | 12/1982 | Sinclair et al. | 350/331 R |
| 4,410,238 A | 10/1983 | Hanson | 350/347 E |
| 4,779,959 A | 10/1988 | Saunders | 350/346 |
| 4,973,124 A | 11/1990 | Kaede | |
| 5,015,057 A | 5/1991 | Rumbaugh et al. | 350/96.15 |
| 5,068,749 A | 11/1991 | Patel | 359/93 |
| 5,111,321 A | 5/1992 | Patel | 359/92 |
| 5,128,798 A * | 7/1992 | Bowen et al. | 359/260 |
| 5,481,402 A | 1/1996 | Cheng et al. | 359/498 |
| 5,611,004 A * | 3/1997 | Chang et al. | 385/11 |
| 5,841,583 A * | 11/1998 | Bhagavatula | 359/577 |
| 5,953,467 A | 9/1999 | Madsen | 385/15 |
| 6,044,187 A | 3/2000 | Duck et al. | 385/33 |
| 6,075,647 A * | 6/2000 | Braun et al. | 359/578 |
| 6,154,591 A | 11/2000 | Kershaw | 385/39 |
| 6,169,604 B1 | 1/2001 | Cao | |
| 6,198,857 B1 | 3/2001 | Grasis et al. | 385/24 |
| 6,212,008 B1 | 4/2001 | Xie et al. | 359/484 |

(Continued)

FOREIGN PATENT DOCUMENTS

EP    0 903 615 A2    3/1999

(Continued)

OTHER PUBLICATIONS

Pochi Yeh, "Some Applications of Isotropic Layered Media," *Optical Waves in Layered Media* (*Wiley Series in Pure and Applied Optics*), John Wiley & Sons, at 144-151 (Sep. 1988).

(Continued)

*Primary Examiner*—Joseph Williams
*Assistant Examiner*—Peter Macchiarolo
(74) *Attorney, Agent, or Firm*—Finnegan, Henderson, Farabow, Garrett & Dunner, LLP

(57) ABSTRACT

A tunable optical filter is provided that includes an array of independently tunable filter elements. Each of the elements is located along a different optical path that extends between an input and an output port. Optical assemblies for receiving an incident optical signal for providing a filtered optical signal are also provided. In one embodiment, polarization independent spectral filtering can be achieved. Wavelength selectable add/drop multiplexers and demultiplexers, dynamic gain equalizers and attenuators, optical channel blockers and branch filters, switches, and modulators are also provided. Furthermore, methods for constructing and operating filters consistent with this invention are also provided.

36 Claims, 19 Drawing Sheets

U.S. PATENT DOCUMENTS

| | | | |
|---|---|---|---|
| 6,285,504 B1 | 9/2001 | Diemeer | 359/578 |
| 6,292,299 B1* | 9/2001 | Liou | 359/583 |
| 6,304,689 B1* | 10/2001 | Dingel et al. | 385/24 |
| 6,333,807 B1 | 12/2001 | Hatayama et al. | 359/308 |
| 6,498,676 B1* | 12/2002 | Zimmerman et al. | 359/337.1 |
| 6,529,328 B1* | 3/2003 | Cheng et al. | 359/578 |
| 6,545,783 B1 | 4/2003 | Wu et al. | |
| 6,714,743 B1* | 3/2004 | Hsieh et al. | 359/251 |
| 2002/0080833 A1* | 6/2002 | Matsuura et al. | 372/20 |
| 2003/0021011 A1* | 1/2003 | Huang et al. | 359/337.1 |
| 2005/0094272 A1* | 5/2005 | Naganuma et al. | 359/579 |

FOREIGN PATENT DOCUMENTS

| | | |
|---|---|---|
| EP | 1 059 753 A2 | 12/2000 |
| EP | 1 098 211 A1 | 5/2001 |

OTHER PUBLICATIONS

Bhagavatula, United States Patent Application Publication No. US 2002/0005989 A1, published on Jan. 17, 2002.

Cao, United States Patent Application Publication No. US 2002/0012494 A1, published on Jan. 31, 2002.

* cited by examiner

TUNABLE OPTICAL FILTER

FIELD OF THE INVENTION

This invention relates to tunable optical filters, and more particularly to filters that have variable spectral reflectance and transmittance functions, and even more particularly to multi-wavelength optical communication systems and high-density wavelength-division multiplexed network systems.

BACKGROUND

It is known that tunable optical filters can be constructed from liquid crystals. For example, Patel U.S. Pat. No. 5,111,321 (hereinafter, "Patel") shows a dual-polarization liquid crystal etalon filter that includes a nematic liquid crystal in a Fabry-Perot cavity. The crystal is divided into two portions that are buffed in orthogonal directions so that they align the liquid crystal parallel to their surfaces. Using a polarization beam diversity scheme, an input beam is split into its orthogonal polarization components and both portions of the Fabry-Perot cavity operate in equal amounts upon the components to induce a polarization independent filter. The spectral location of the transmittance peak maximum is tunable by varying the voltage applied to the etalon. Patel uses a single voltage generator to apply a potential difference across both portions of the cavity, which disadvantageously limits the tunability of the filter.

Kershaw U.S. Pat. No. 6,154,591 (hereinafter, "Kershaw") also shows a tunable optical device. The device shown by Kershaw includes multiple optical waveguides separated by a space filled with a liquid crystal that is oriented by an alignment layer or grating to form a Fabry-Perot resonant cavity. During operation, applying a voltage across the cavity alters the refractive index of the liquid crystal. Kershaw shows an array of filters that can be constructed using optical fibers positioned between a substrate and a superstrate enabling independent tuning of each filter. Each of the filters is used to filter a separate optical signal and those signals do not mix, limiting tunability.

Dingel et al. U.S. Pat. No. 6,304,689 (hereinafter, "Dingle et al.") shows a general multi-function filter that uses a Michelson-Gires-Tournois resonator. The filter shown by Dingel et al. can allegedly function as a channel passing filter, a channel dropping filter, and a bandpass filter, depending on the interferometer arm length difference and reflectance. In the resonator used by Dingel et al., one of the reflecting mirrors of a Michelson interferometer or a Tynman-Green interferometer is substituted with a Gires-Tornouis resonator, which allegedly makes the line width narrower and contrast greater for the channel passing filter. The device shown by Dingel et al. is bulky and relatively expensive to manufacture.

Additional tunable filters are described, for example, in Diemeer U.S. Pat. No. 6,285,504 and Cheng et al. U.S. Pat. No. 5,481,402.

It is also known that liquid crystals can be used to form Fabry-Perot interferometer-based electro-optic modulators. For example, Saunders U.S. Pat. No. 4,779,959 (hereinafter, "Saunders") shows such an electro-optic modulator in which a liquid crystal is placed between mirror layers, each of which bears a respective rubbed polyimide layer that provides homogeneous alignment of the liquid crystal molecules. The mirrors are connected to an electrical bias that can be varied between two values: above and below a threshold for refractive index sensitivity. Saunders uses a single liquid crystal modulator to modulate an optical signal. Saunders, however, does not show how to construct an arbitrary tunable modulator.

It is further known that liquid crystals can be used to form variable optical attenuators. For example, Sinclair et al. U.S. Pat. No. 4,364,639 (hereinafter, "Sinclair et al.") shows a variable attenuation electro-optic device that has passes light through a dynamic scattering liquid crystal cell whose optical transmittance can be varied by varying an AC electric field applied across it. Sinclair et al. describes reflective and transmissive embodiments using Selfoc type lenses. By adjusting the length of such a lens, it can be used to focus, diverge, invert, or collimate a light beam, performing the same functions as regular spherical optics with the added benefit that the end-surfaces are flat. The attenuators shown by Sinclair, however, are relatively chromatically inflexible.

It is also known that liquid crystals can be used to form optical fiber-based attenuators. For example, Rumbaugh et al. U.S. Pat. No. 5,015,057 (hereinafter, "Rumbaugh et al.") describes a polarization insensitive optical attenuator that uses a polymer-dispersed liquid crystal film to provide attenuation over a range of attenuation values. Rumbaugh et al. shows a liquid crystal film between adjacent sections of an optical fiber, a tubular housing for retaining the liquid crystal between the adjacent sections, and a voltage source for applying an electric field across the liquid crystal. The device shown by Rumbaugh et al. always uses a single liquid crystal cell between sections of an optical fiber.

Hanson U.S. Pat. No. 4,410,238 (hereinafter, "Hanson") shows an optical switch attenuator that includes two slabs of birefringent material having a liquid crystal polarization rotator as a control element between the slabs. By controlling the rotator electrically, Hanson selects a variable ratio of transmitted-to-displaced output optical power. Hanson does not show a broadly tunable optical switch.

Other types of attenuators are known, such as attenuators that use neutral density filters or circularly graded half-slivered mirrors that are moveable or rotatable into and out of the beam path. These mechanical attenuators, however, are generally costly, unreliable, and bulky.

Madsen U.S. Pat. No. 5,953,467 (hereinafter, "Madsen") shows a switchable optical filter that includes an optical splitter coupled to an input waveguide, one or more output waveguides, and multiple interferometer waveguides. During operation, a multi-wavelength signal is split into the interferometer waveguides. Then, using a sequence of controllable phase shifters and reflective filters, specific wavelength signals are reflected from a respective interferometer waveguide into the splitter and then to a respective output waveguide. In one embodiment, Madsen changes the relative phase difference for the reflected light in each waveguide to vary the output port. Unfortunately, Madsen requires complex interferometric waveguides and phase-shifters.

Finally, Grasis et al. U.S. Pat. No. 6,198,857 shows an add/drop optical multiplexing device. The device includes a filter assembly defining a light path that extends from a common port, serially through a first channel port and a second channel port, and finally a pass-through port. The first and second ports each have substantially the same transmittance and reflectance properties. The device shown by Grasis et al. includes filter elements, but these elements are not necessarily tunable.

It would therefore be desirable to provide reliable, compact, and inexpensive methods and apparatus for tunable spectral filtering.

It would also be desirable to provide methods and apparatus for polarization independent tunable filtering.

It would be further desirable to provide methods and apparatus for multiplexing and demultiplexing optical channels.

It would be more desirable to provide methods and apparatus for dynamic gain and spectral equalization.

It would be still more desirable to provide methods and apparatus for tunable optical blocking, switching, and modulation.

SUMMARY OF THE INVENTION

It is therefore an object of this invention to provide methods and apparatus for reliable, compact, and inexpensive tunable spectral filtering.

It also an object of this invention to provide methods and apparatus for polarization independent tunable filtering.

It is a further object of this invention to provide methods and apparatus for multiplexing and demultiplexing optical channels.

It is another object of this invention to provide methods and apparatus for dynamic gain and spectral equalization.

It is yet another object of this invention to provide methods and apparatus for tunable optical blocking, switching, and modulation.

In accordance with this invention, a tunable optical filter is provided. The filter can include an optical assembly for receiving incident light, an optical assembly for providing a filtered light, and a plurality of independently tunable filter elements. Each of the elements is located along a different optical path, although these paths all pass through the assemblies. Also, each of the filter elements filters a different component of the incident optical signal such that, when the components are combined, a filtered optical signal is formed.

It will be appreciated that in its most simple form, a filter consistent with this invention only needs to include multiple independently tunable filter elements that are appropriately positioned to receive an incident signal and reflect and/or transmit a filtered one. Thus, a filter consistent with this invention can operate in reflection mode, a transmission mode, and a simultaneous combination thereof.

According to yet another aspect of this invention, a method of tunable optical filtering is provided. The method includes dividing an incident optical beam into a plurality of beam components, filtering each of the components with at least one independently tunable filter elements, and combining the components after filtering to form a filtered optical beam.

BRIEF DESCRIPTION OF DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
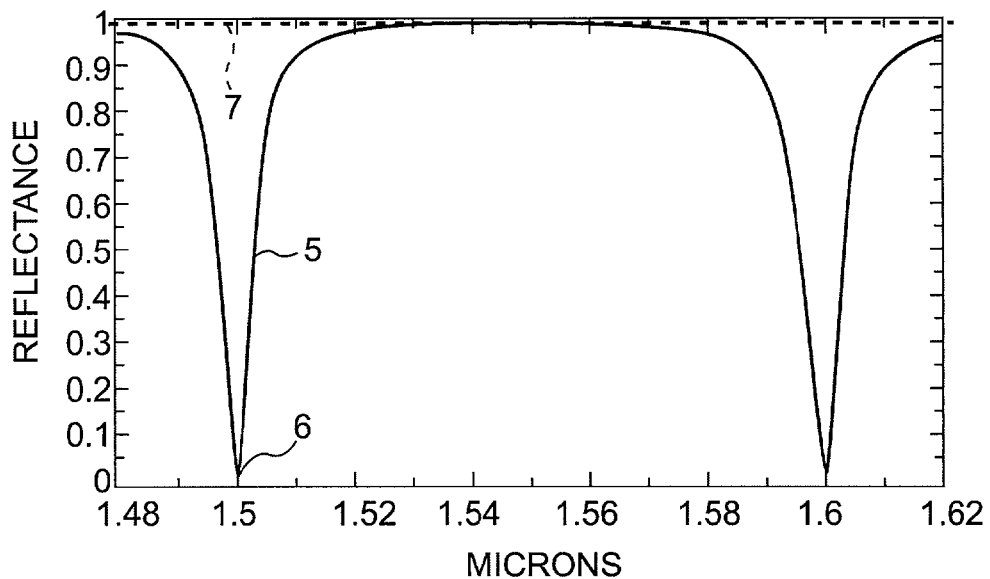
FIG. 1 shows simulated reflectance spectra for a pixelated Fabry-Perot etalon and a pixelated Gires-Tornouis etalon with all of the filter elements tuned to 1.5 microns, consistent with this invention.

A filter consistent with this invention includes an optical assembly for receiving an incident optical signal, an optical assembly for providing a filtered optical signal, and a plurality of independently tunable filter elements. Each of the elements is located along a different optical path, although each of the paths intersects at least at the assemblies. Also, each of the filter elements filters a different component of the incident optical signal such that, when the components are combined, a filtered optical signal is formed.

During operation, a beam is spatially divided into at least two different components that are separately directed to at least two of the filter elements (i.e., pixels). As used herein, a pixel is the smallest independently controllable element of a filter. Each of the pixels acts like a tunable filter that can be tuned to reject a particular band of frequencies. When the pixels simultaneously filter different components of the beam, a composite filtered beam is formed from the individual filtered components.

In one embodiment of this invention, the filter can include two or more Fabry-Perot etalons. A Fabry-Perot etalon is, generally, a nonabsorbing, multireflecting device that serves as a multi-layer, narrow-band pass filter. A Fabry-Perot etalon can be formed from two substantially parallel planar reflectors separated by a gap, which can be filled with an optically active material (e.g., electro-optic material, such as a liquid crystal layer, a thermo-optic material, such as glass or a polymer, etc.). In the case of a Fabry-Perot etalon, the two planar reflectors have substantially the same reflectance and can operate in either reflection mode or transmission mode. It will be appreciated that the physical distance, and thus the optical path, between the reflectors can be varied using MEMS, or any other mechanical device capable of actuating the position of at least one of the reflectors.

When an optically active layer is used, such as a liquid crystal, the index of refraction of the layer can be varied by applying a voltage between electrodes disposed on each of the reflectors. It will be appreciated that the reflector can be electrically conductive, in which case the reflector itself can act as the electrode.

A filter can be formed from a single Fabry-Perot etalon structure that is pixelated to form an array of active pixel areas (i.e., filter elements). The array can be a one-dimensional, two-dimensional, or three-dimensional (i.e., if cascaded). The filter can be constructed so that each of the filter elements has a free spectral range (hereinafter, "FSR") that is wider than a predetermined spectral band (i.e., the band that needs to be controlled). For example, an acceptable FSR is about 150 nm centered on 1575 nm. When the FSR is sufficiently wide, the default reflectance or transmittance spectrum of the element can be made substantially flat. This flat default spectrum can be especially useful to protect against catastrophic optical events, such as when a controlling voltage source fails.

Furthermore, the filter can be constructed such that when no voltage is applied to the individual filter elements, the individual filter elements (as well as the filter as a whole) is tuned to have a transmission wavelength that is outside that spectral band. In this case, all wavelengths inside the band are reflected. The reflected light can then be collected and coupled to an output fiber.

If a certain wavelength λ in the band needs to be attenuated, an appropriate voltage can be applied to one or more of the pixels and tuned to λ, thereby attenuating the reflectance spectra. It will be appreciated that when just one pixel is used, only a minimum amount of attenuation can be applied. Hence, attenuation can be controlled in finer increments by dividing the beam into many components, and directing each of those components to an independently tunable pixel. The shape of the attenuated region of the spectrum depends on the finesse of the filter, which is determined by the reflection coefficients of the pair of reflectors as well as the thickness of the etalon cavity. The finesse and the number of pixels can be chosen to construct a desirably smooth tunable filter.

The exact number and precise dimensions of the individual filter elements largely depends on the filter application. It has been found, for example, that when building a gain equalizer, 10 or more filter elements can be used, however, less than fifty filter elements, and in particular about 20 filter elements, has been found to be satisfactory. In the case of a wavelength division multiplexing (hereinafter, "WDM") filter, an effective number of filter elements has been found to range anywhere between 2 and about 20.

When a Fabry-Perot filter element is used, the reflection coefficient of the element's reflectors can be between 0.3 and somewhat less than 1.0. For WDM filter applications, reflection coefficients are generally large to form narrow passbands (or "dips") in the filtered spectra, and can be between about 0.7 and about 1.0, preferably between about 0.9 and about 1.0, and most preferably between about 0.98 and about 1.0. For example, when 2 filter elements are tuned 0.25 nm away each other, a reflection coefficient of 0.99 will generate about 0.5 nm of a full-width-half-maximum ("FWHM") passband at a selected wavelength, while a 0.98 reflection coefficient will only generate about 0.75 nm passband.

Also, with a multi-element filter consistent with this invention, a filter profile with a substantially flat top can be generated while minimally sacrificing peak transmittance. Thus, a filter consistent with this invention provides a flexible method for tailoring filter profiles, such as for WDM filter applications.

Although not wishing to be bound by any particularly theory, it will be appreciated that the phase and amplitude of a Fabry-Perot etalon are normally effected during operation in reflection mode:

$$A = r\frac{\exp i\theta - 1}{1 - r^2 \exp i\theta}$$

where A is the amplitude of a reflected optical signal, r is the reflection coefficient of each of the reflectors, and θ is the round-trip phase delay between the beams reflected from the reflectors (i.e., θ=2d/λ).

In a Fabry-Perot etalon, maximum transmittance is achieved when all filter elements are tuned to have resonance outside the desired band. To induce loss at a particular wavelength or band, one or more filter elements can be tuned to reflect at that wavelength or narrow band, accordingly. For each filter element added, the reflectance or transmittance of the filter as a whole can be decreased or increased. By tuning just one filter element to a particular wavelength, transmittance can be reduced to $(1-1/N)^2 \sim 1-2/N$.

A simple numerical model can be used to estimate the performance of a tunable multi-element filter consistent with this invention. Assume that the modal field of a single mode fiber, after being imaged backwards by a lens on the element, is F(x,y). Also assume that the input field after the element is A(x,y). Then, the transmittance into the fiber can be written substantially as:

$$T = \frac{\left|\int A(x,y) F^*(x,y) dx dy\right|^2}{\int AA^* dx dy \int FF^* dx dy}.$$

It will be appreciated that this expression is simply the overlap of the input field with the modal field, normalized by the product of the two fields. If the fields are identical and overlap is maximized, perfect transmittance (T=1) occurs. In contrast, when overlap is minimized (i.e., zero), essentially no transmission occurs.

If the input field to the element perfectly matches the fiber field, then the element has no amplitude or phase modulation and transmittance is maximized (e.g., T=1). We can simplify the calculation by further assuming that field F is uniform over the aperture of area S. It will be appreciated, however, that more exact calculations can be made by including Gaussian profiles. The filter can be divided into N sections of equal area S/N, where S is the total filter area on which the input field is incident. Then, each filter element modifies the input field incident on the element to be $A_n$.

Under these assumptions, transmittance T of the filter is substantially equal to:

$$T = \left|\frac{1}{N}\Sigma A_n\right|^2.$$

As described above, and according to one embodiment of this invention, each of the filter elements can be a separately tunable liquid crystal Fabry-Perot resonator. In this case, tuning can be performed by varying the amplitude of the input field of each element, the phase of each element, or a combination of amplitude and phase.

In another embodiment consistent with this invention, the filter elements can be Gires-Tornouis etalons. Like the Fabry-Perot etalon, a Gires-Tornouis etalon is a substantially nonabsorbing, multireflecting device that serves as a multilayer, narrow band pass filter. Unlike a Fabry-Perot etalon, the two planar reflectors have different reflection coefficients, one of which has a reflection coefficient of about 1.0. For this reason, a Gires-Tornouis etalon can only operate in reflection mode. In order to vary the index of refraction of the optically active layer (e.g., liquid crystal layer), an electrode can be disposed on each of the reflectors or, when the reflector is electrically conductive, the reflector itself can act as the electrode.

When a Gires-Tornouis etalon is tuned, only the phase of the light, not its amplitude reflectance (which is always about 1), changes. Attenuation can be induced, however, by controllably interfering light reflected by two or more different filter elements.

Thus, amplitude reflectance is always about 1, but the phase will be wavelength dependent as follows:

$$A = \frac{\exp i\theta - r}{1 - r \exp i\theta}.$$

The phase at resonance (i.e., A=1) is inverted with respect to anti-resonance (i.e., A=-1). As in the case of a Fabry-Perot etalon, etalons can be designed so that resonances can be tuned beyond a desirable predetermined band.

However, unlike the case of a Fabry-Perot etalon, a Gires-Tornouis etalon has no loss at those resonant wavelengths because the phase is uniform. By tuning a filter element to a different wavelength, a change in transmittance can be induced both at that wavelength and at the original resonance wavelength because both wavelengths see a non-uniform phase front. This tuned filter element now interferes destructively with the background field, leading to a transmittance substantially equally to about $(1-2/N)^2 \sim 1-4/N$.

Figure 2:
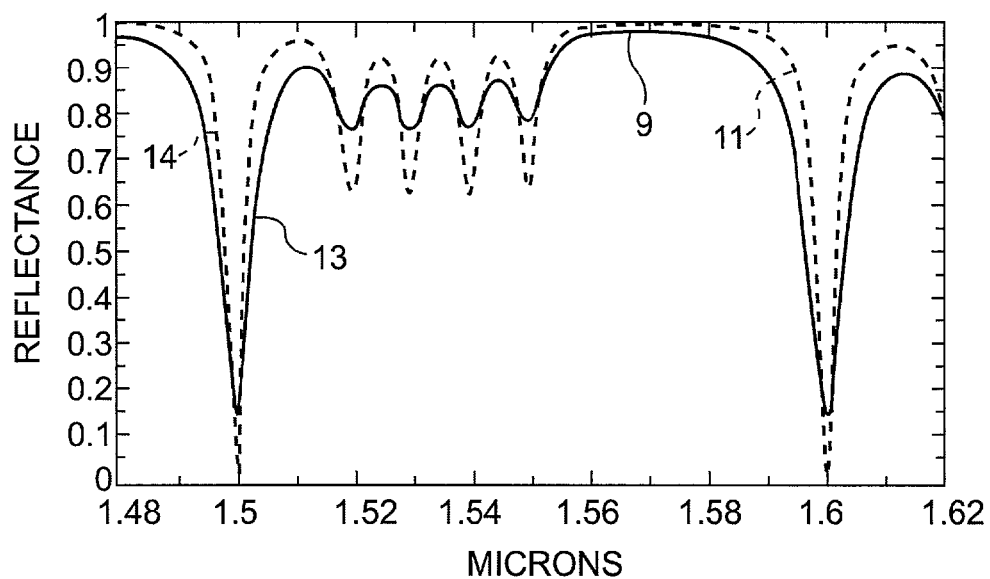
FIG. 2 shows simulated reflectance spectra for the same Fabry-Perot and Gires-Tornouis etalons used in FIG. 1, except that four of the ten filters have been tuned to 1.52, 1.53, 1.54, and 1.55 microns, consistent with this invention.
Figure 3:
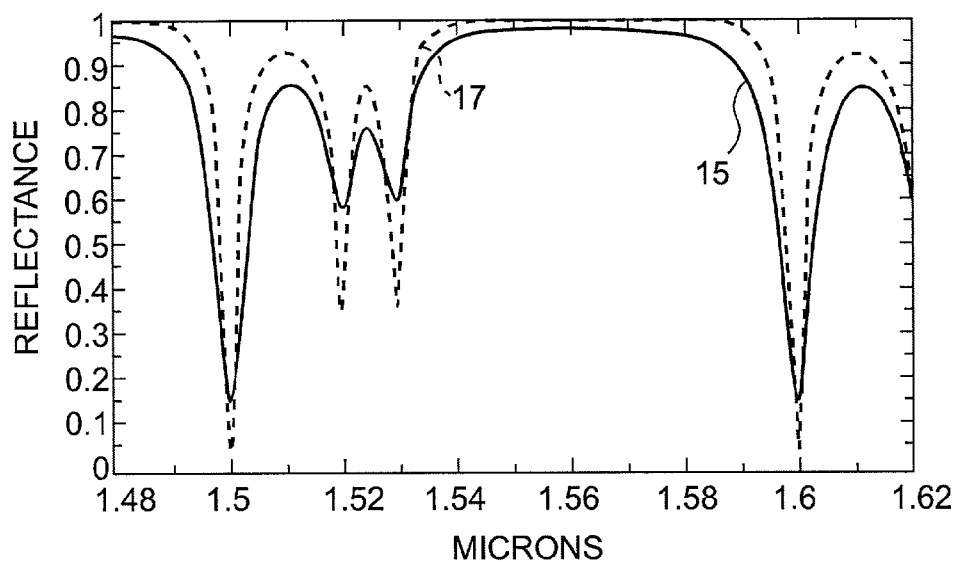
FIG. 3 shows simulated reflectance spectra for the same Fabry-Perot and Gires-Tornouis etalons used in FIGS. 1 and 2, except that two of the filter elements are tuned to 1.52 microns and two of the filter elements are tuned 1.53 microns, consistent with this invention.

FIGS. 1–3 show the effect of tuning individual filter elements consistent with this invention.

FIG. 1 shows simulated reflectance spectra 5 and 7 for a pixelated Fabry-Perot etalon and a pixelated Gires-Tornouis etalon, respectively. Both spectra were simulated using ten filter elements and a gap thickness of 7 microns. In the case of the Fabry-Perot etalon, both reflectors have a reflection coefficient equal to 0.8. In the case of the Gires-Tournouis etalon, however, only the front reflector has a reflection coefficient equal to 0.8; the back reflector has a reflection coefficient of about 1.0. In both cases, all ten of the filter elements were tuned to 1.50 microns. Thus, Fabry-Perot spectrum 5 has reflectance dip 6 (i.e., a transmittance that peaks) at 1.5 microns. It will be appreciated that a similar peak occurs at 1.6 microns, so that the FSR of spectrum 5 is about 0.1 microns. In contrast to the Fabry-Perot spectrum 5, Gires-Tornouis spectrum 7 is flat across the entire spectrum because all filter elements are in phase with one another.

FIG. 2 shows simulated reflectance spectra 9 and 11 for the same Fabry-Perot and Gires-Tornouis etalons used in FIG. 1, except that four of the ten filters have been tuned to 1.52, 1.53, 1.54, and 1.55 microns. Now, both reflectance spectra 9 and 11 have a large dip at 1.5 microns as well as four smaller dips at 1.52, 1.53, 1.54, and 1.55 microns.

In the case of the Fabry-Perot etalon, the effect of tuning four of the ten filter elements is that dip 13 (shown in FIG. 2) is shallower (i.e., reflects more) than corresponding dip 6

(shown in FIG. 1) at 1.50 microns. Also, the four smaller dips at 1.52, 1.53, 1.54, and 1.55 microns have appeared for the first time and have reflectance minima of approximately 0.75.

In the case of the Gires-Tornouis etalon, the effect of tuning four of the ten filter elements is that large dip 14 and four smaller dips at 1.52, 1.53, 1.54, and 1.55 microns appear for the first time. It will be appreciated that the dips in Gires-Tornouis spectrum 11 are narrower and deeper and exhibit lower insertion loss that the respective dips in Fabry-Perot spectrum 9.

FIG. 3 shows simulated reflectance spectra 15 and 17 for the same Fabry-Perot and Gires-Tornouis etalons used in FIGS. 1 and 2, except that two of the filter elements are tuned to 1.52 microns and two of the filter elements are tuned 1.53 microns. Now, both reflectance spectra 15 and 17 have a relatively large dip at 1.5 microns as well as two smaller dips at 1.52 and 1.53 microns. Like the spectra shown in FIG. 2, the reflectance minima in Gires-Tornouis spectrum 17 are narrower and deeper and exhibit lower insertion loss than the respective dips in the Fabry-Perot spectrum 15.

Figure 4:
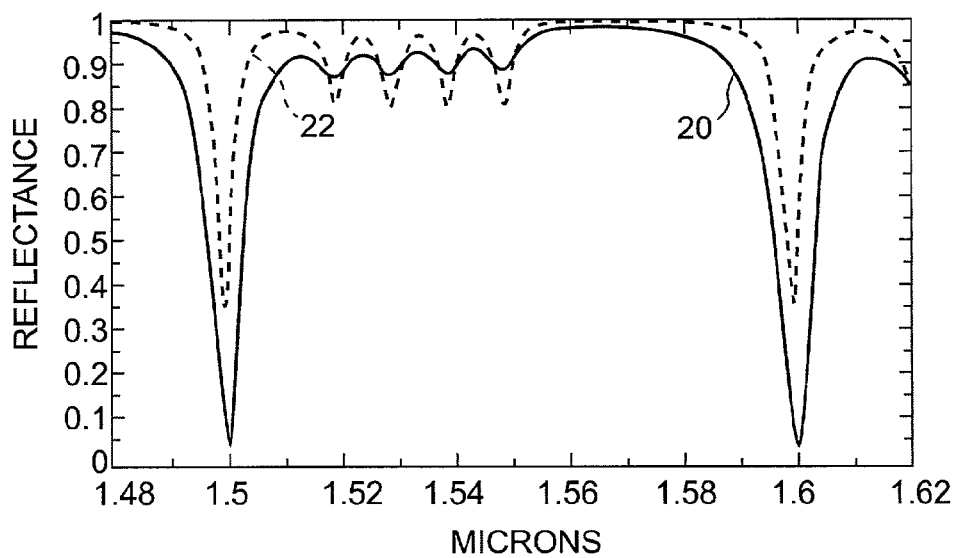
FIG. 4 shows additional simulated reflectance spectra for a pixelated Fabry-Perot etalon and a pixelated Gires-Tornouis etalon using twenty filter elements, four of which were tuned to 1.52, 1.53, 1.54, and 1.55 microns, and sixteen of which were tuned to 1.50 microns, consistent with this invention.

A comparison between FIGS. 2 and 4 shows how the number of filter elements affects the reflectance spectra consistent with this invention. FIG. 4 shows simulated reflectance spectra 20 and 22 for a pixelated Fabry-Perot etalon and a pixelated Gires-Tornouis etalon, respectively. In contrast to FIG. 2, which only includes reflectance spectra for ten filter elements, spectra 20 and 22 of FIG. 4 were simulated using twenty filter elements, four of which were tuned to 1.52, 1.53, 1.54, and 1.55 microns, and sixteen of which were tuned to 1.50 microns. Thus, the etalons used to simulate the spectra shown in FIG. 4 have a smaller percentage of surface area that is tuned to wavelengths that are different from 1.50 microns when compared to the etalons used to simulate the spectra shown in FIG. 2. A comparison of the spectra shown in FIGS. 2 and 4 reveals that this smaller surface area causes the small dips at 1.52, 1.53, 1.54, and 1.55 microns to be less deep and the large dip at 1.50 microns to be more deep.

Figure 5:
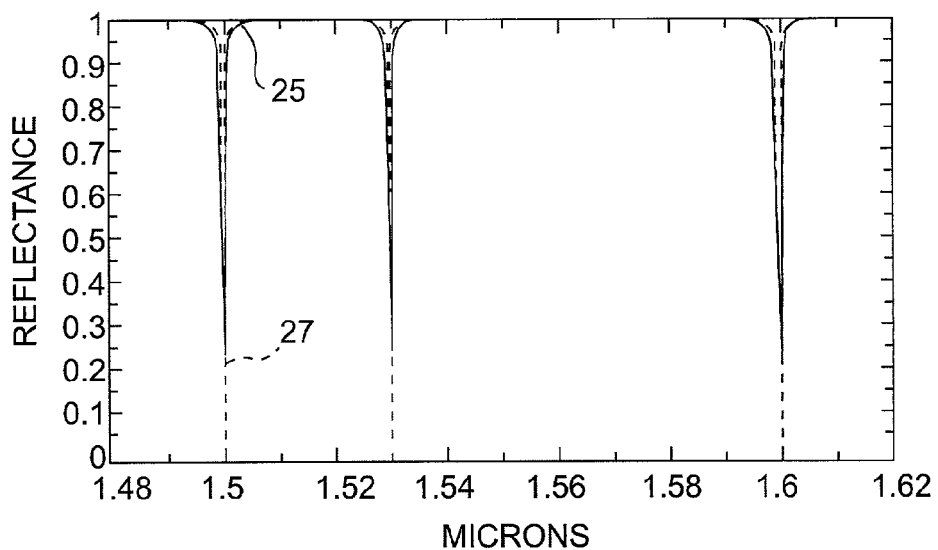
FIG. 5 shows more simulated reflectance spectra for a pixelated Fabry-Perot etalon and a pixelated Gires-Tornouis etalon using 2 filter elements having reflection coefficients of 0.98, with one tuned to 1.50 microns and the other tuned to 1.53 microns, consistent with this invention.
Figure 6:
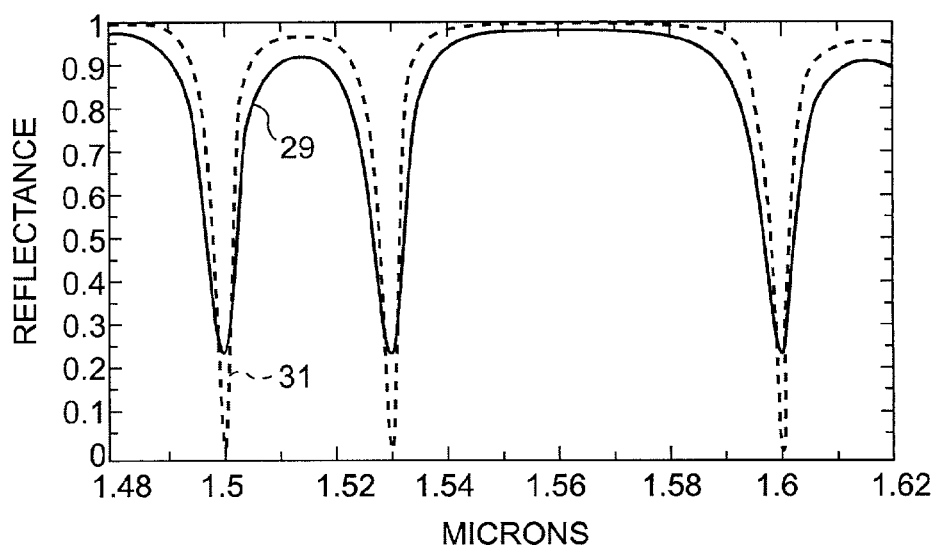
FIGS. 6 and 7 show simulated reflectance spectra that are similar to FIG. 5, except that the reflectance of the filter element reflectors were 0.8 and 0.64, respectively, consistent with this invention.
Figure 7:
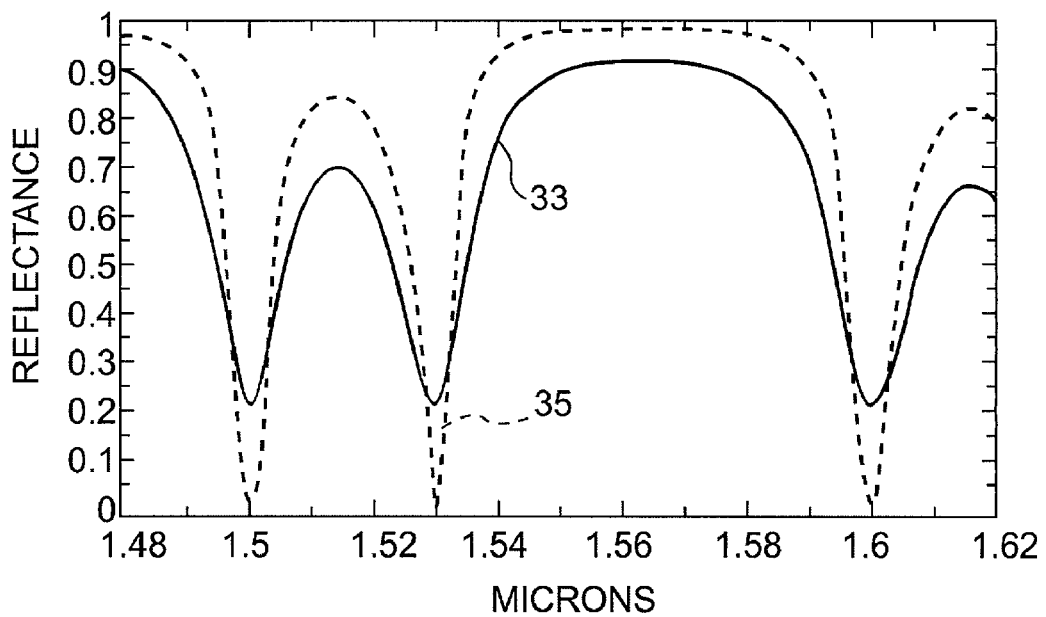

FIGS. 5–7 show the effect of the reflection coefficients of individual filter element reflectors consistent with this invention.

FIG. 5 shows simulated reflectance spectra 25 and 27 for a pixelated Fabry-Perot etalon and a pixelated Gires-Tornouis etalon, respectively. Both spectra were simulated using 2 filter elements and a gap thickness of 7 microns. For each etalon structure, one filter element was tuned to 1.50 microns and the other filter element was tuned to 1.53 microns. In the case of the Fabry-Perot etalon, both reflectors have a reflection coefficient equal to about 0.98. In the case of the Gires-Tournouis etalon, however, only the front reflector has a reflection coefficient equal to 0.98; the back reflector has a reflection coefficient of about 1.0.

FIGS. 6 and 7 are similar to FIG. 5, except that the reflection coefficients of the individual filter elements are less. In FIG. 6, the etalons used to simulate the reflectance spectra had coefficients that were 0.8 (although the back reflector of the Gires-Tournouis etalon has a reflection coefficient of about 1.0). Similarly, in FIG. 7, the etalons used to simulate the reflectance spectra had a reflection coefficient of 0.64 (although, again, the back reflector of the Gires-Tournouis etalon has a reflection coefficient of about 1.0). Inspection of FIGS. 5–7 reveals that as the reflection coefficient of the reflectors decreases, the width of the dips in the spectra become less deep, yet broader.

Figure 8:
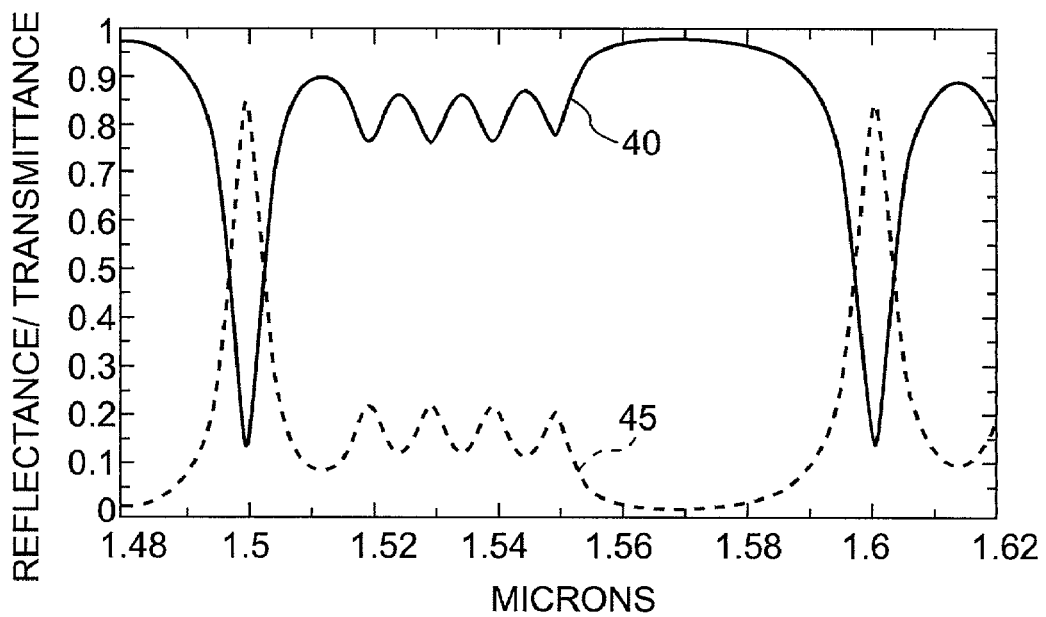
FIG. 8 shows the same Fabry-Perot reflectance spectrum shown in FIG. 2, plus a corresponding transmittance spectrum (assuming no absorption), consistent with this invention.

It will be appreciated that for a Fabry-Perot filter element, or for a Fabry-Perot etalon that includes multiple filter elements, the sum of the reflectance and the transmittance, for any particular wavelength, is equal to one, assuming no absorption. Thus, as shown in FIG. 8, reflectance spectrum 40 (which is the same as spectrum 9 of FIG. 2) plus transmittance spectra 45 equals one. In a Gires-Tornoius etalon, however, transmittance of any individual filter element and of a filter made from such elements, is always essentially zero.

Figure 9:
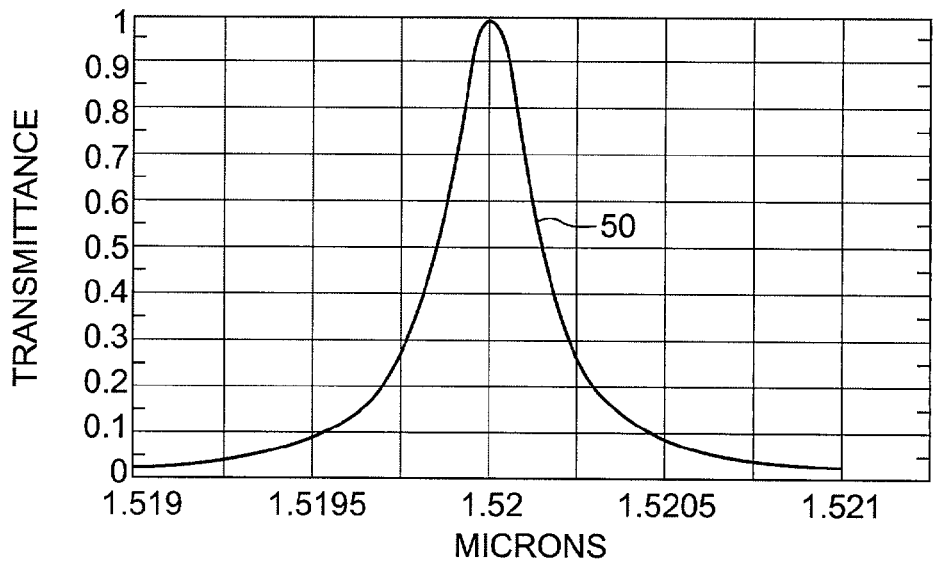
FIG. 9 shows simulated reflectance spectrum for a single Fabry-Perot filter element that has a reflection coefficient of about 0.99 and that is tuned to 1.5200 microns, consistent with this invention.
Figure 10:
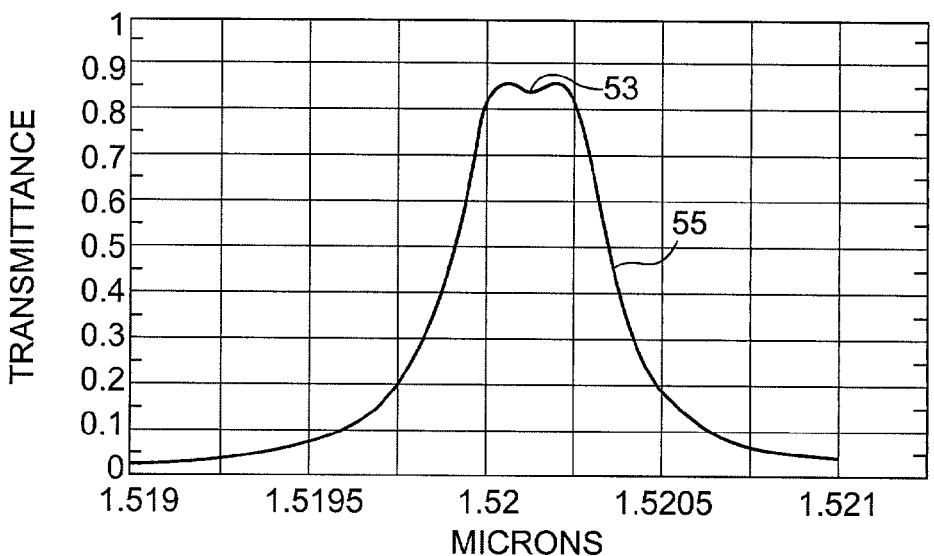
FIG. 10 shows simulated reflectance spectrum for two Fabry-Perot filter elements that each have a reflection coefficient of about 0.99, with one filter element tuned to 1.52000 microns and the other filter element is tuned to 1.52025 microns, consistent with this invention.
Figure 11:
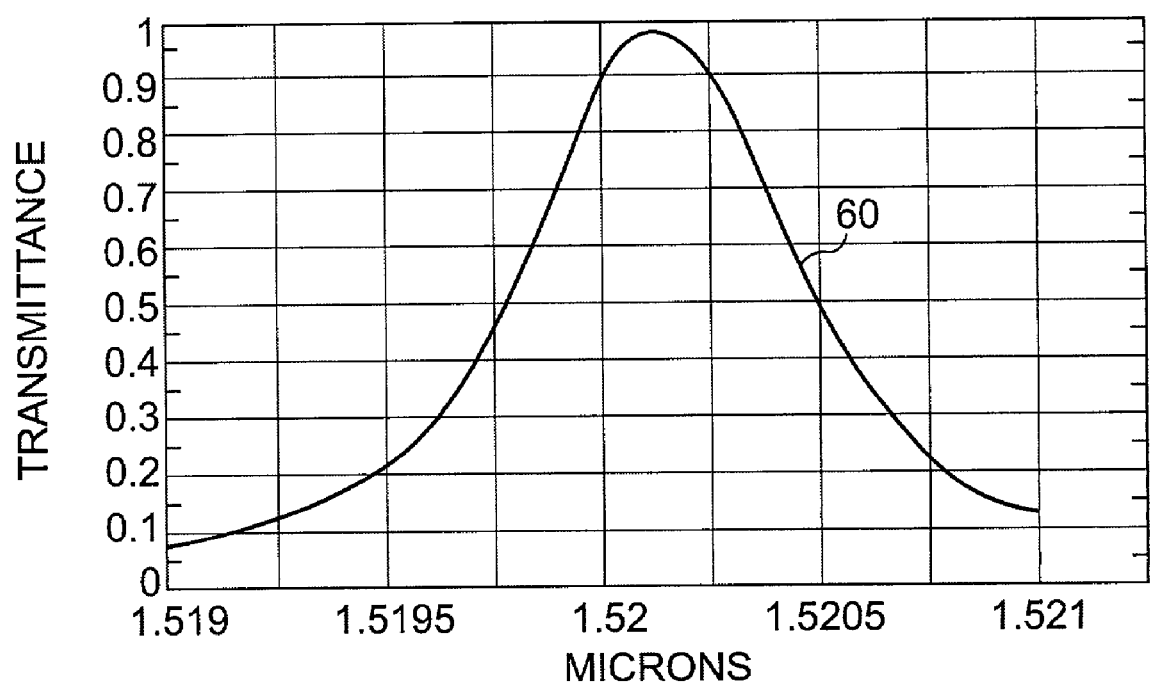
FIG. 11 shows simulated reflectance spectrum for two Fabry-Perot filter elements that each have a reflection coefficient of about 0.98 and a free spectral range of 0.1 micron, with one filter element tuned to 1.52000 microns and the other filter element tuned to 1.52025 microns, consistent with this invention.

FIGS. 9–11 show how a filter constructed from Fabry-Perot filter elements can be tuned to achieve a desirable transmittance spectrum that could be used, for example, in a WDM filter application. FIG. 9 shows simulated reflectance spectrum 50 for a single Fabry-Perot filter element that has a reflection coefficient of about 0.99, a FSR of 0.1 micron, and which is tuned to 1.5200 microns. FIG. 10 shows simulated reflectance spectrum 55 for two Fabry-Perot filter elements that each have a reflection coefficient of about 0.99 and a FSR of 0.1 micron. One of the filter elements is tuned to 1.52000 microns and the other filter element is tuned to 1.52025 microns. The spectra of the individual filter elements are not shown separately, but are apparent as dip 53 in the peak of spectrum 55.

FIG. 11 shows simulated reflectance spectrum 60 for two Fabry-Perot filter elements that each have a reflection coefficient of about 0.98 and a FSR of 0.1 micron. Like in FIG. 10, one of the filter elements is tuned to 1.52000 microns and the other filter element is tuned to 1.52025 microns. In FIG. 11, however, no dip appears at the peak of spectrum 60 because the component spectra are somewhat broader due to the lower reflection coefficient value.

FIGS. 12–26 show various illustrative tunable optical filters, and devices constructed with the filters, consistent with this invention.

Figure 12:
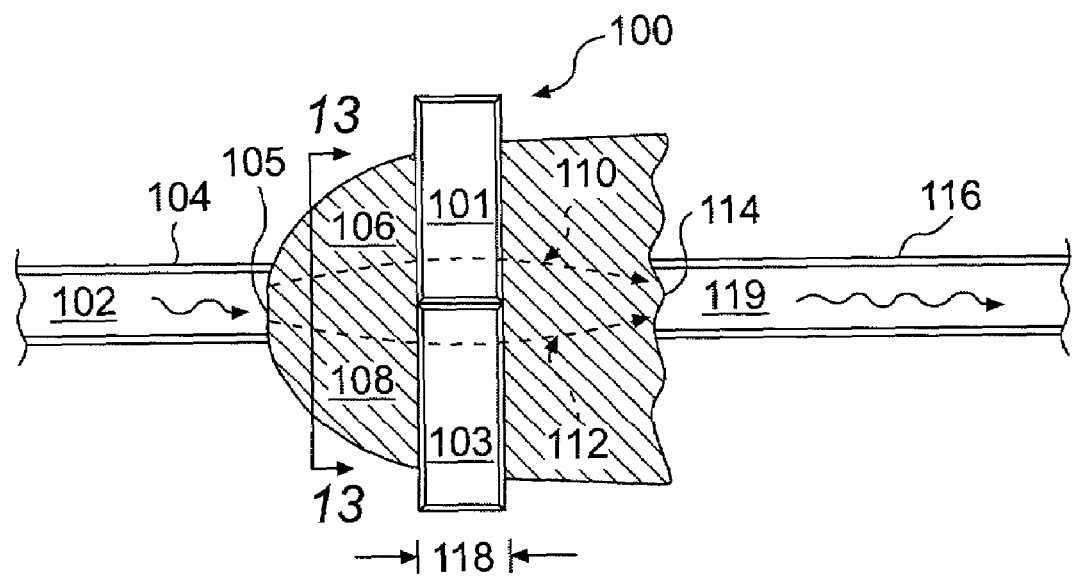
FIG. 12 shows a top planar view of an illustrative filter that includes two filter elements, consistent with this invention.

FIG. 12 shows a top planar view of illustrative filter 100 consistent with this invention. As shown in FIG. 12, filter 100 filters incident optical beam 102, which is provided by input fiber 104, in transmission mode. Beam 102 is capable of being divided into two or more optical components 106 and 108 that can be directed to travel along different optical paths 110 and 112, respectively. Each path starts at tip 105 of input fiber 104 and ends at tip 114 of output fiber 116.

Figure 13:
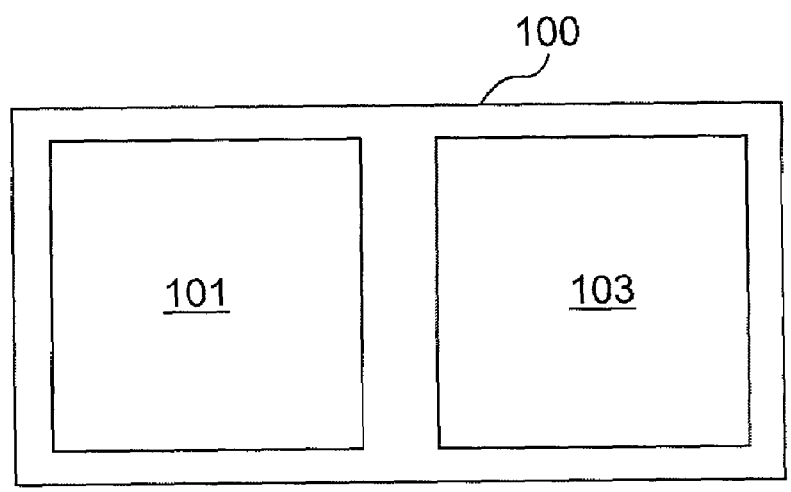
FIG. 13 shows a longitudinal elevational view of the filter shown in FIG. 12, taken from line 13—13 of FIG. 12, consistent with this invention.

In one embodiment, filter 100 can be an etalon that includes a two-dimensional array of independently tunable filter elements. FIG. 13 shows a longitudinal elevational view of filter 100, taken from line 13—13 of FIG. 12, which includes at least filter elements 101 and 103. As best shown in FIG. 12, elements 101 and 103 are located along optical paths 110 and 112, respectively. After optical components 106 and 108 are transmitted through filter 100, those components (or portions thereof) follow optical paths 106 and 108 and combine at tip 114 to form filtered optical signal 119.

It will be appreciated that before optical components 106 and 108 enter filter 100, they are effectively part of the same beam. The boundary between these components is defined only by the boundary that exists between filter elements 101 and 103. However, one or more optical elements, such as a lens, a micro-lens, a prism, diffractive optics, or a polarization beam splitter, can be used to collimate, diffract, deflect, separate, or polarize the incident light before entering filter 100, if desired.

It will be further appreciated that filter 100 has thickness 118, across which optical components 106 and 108 propagate. As components 106 and 108 propagate through filter 100, these components diverge reducing the amount of light that can be collected by fiber tip 114. Thus, when thickness 118 is large, the amount of light that can be collected (without, for example, a lens) by fiber tip 114 is small. Thus, in an embodiment that does not include a converging optical element between filter 100 and fiber tip 114, filter 100 is preferably relatively thin. Of course, if a converging optical element were used between filter 100 and fiber tip 114, the amount of light that could be collected, after transmission through the elements would increase.

Figure 14:
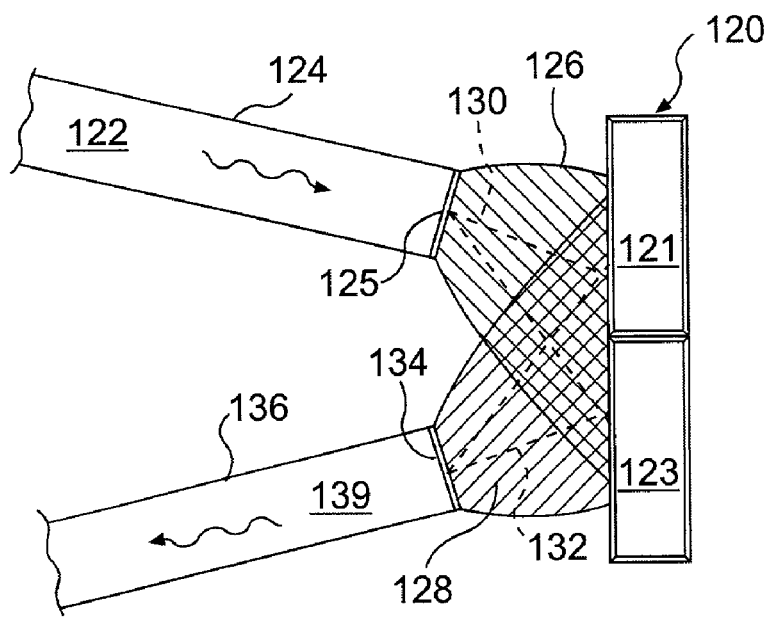
FIG. 14 shows a top planar view of another illustrative filter, consistent with this invention.

FIG. 14 shows a top planar view of illustrative filter 120 consistent with this invention. In contrast to filter 100, which was designed to operate in a transmission mode, filter 120 filters incident optical beam 122 provided by input fiber 124 in a reflection mode. Like beam 102, beam 122 is divided into two or more optical components 126 and 128 that can be directed to travel along different optical paths 130 and 132, respectively. Each path starts at tip 125 of input fiber 124 and ends at tip 134 of output fiber 136 such that, when combined, components 126 and 128 form output beam 139.

Like filter 100, filter 120 can be an etalon that includes a one-dimensional or multi-dimensional array of independently tunable filter elements. Although FIG. 14 only shows two filter elements 121 and 123, it will be appreciated that a filter consistent with this invention can include any number of elements that may be necessary to achieve a desirable level of filter tunability.

A filter consistent with this invention can also operate in both the reflection and transmission modes simultaneously. Such a filter can be constructed by placing a reflection output fiber on the input side of the filter (as shown in FIG. 14) and a transmission output fiber on the side opposite the input side of the filter (as shown in FIG. 12). As described more fully below, additional input and output ports (e.g., fibers) can be added to a filter consistent with this invention.

Figure 15:
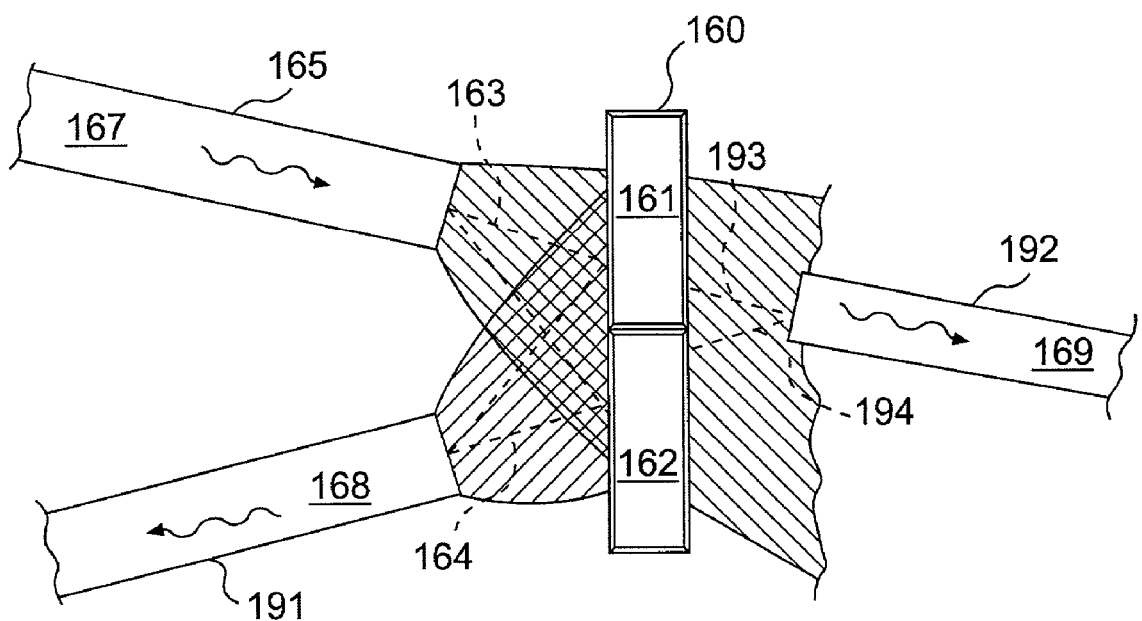
FIG. 15 shows yet another illustrative filter consistent with this invention that can operate in both reflection mode and transmission mode simultaneously.

For example, FIG. 15 shows illustrative filter 160 consistent with this invention that can operate in both reflection mode and transmission mode simultaneously. Filter 160 includes a plurality of independently tunable filter elements 161 and 162. Elements 161 and 162 are located along different optical paths 163 and 164, respectively, although both paths intersect near the tips of fibers 165 and 191. As described above, each filter element filters a different component of incident optical signal 167 such that, when the components are combined, filtered optical signal 168 is formed in reflection mode and filtered optical signal 169 is formed in transmission mode.

It can be seen from FIG. 15, then, that a first component of incident beam 167 travels along path 163 during which time a portion of that beam can be reflected by filter element 161 and redirected to fiber 191 to partially form filtered beam 168. Similarly, a different portion of the first component can travel through element 161 and be transmitted along path 193 to output fiber 192 to partially form filtered beam 169.

In an identical fashion, a second component of incident beam 167 travels along path 164 during which time a portion of that beam may be reflected by filter element 162 and redirected to fiber 191 to partially form filtered beam 168. A different portion of the second component can, depending on the state of the filter, travel through element 162 and be transmitted along path 194 to output fiber 192 to partially form filtered beam 169.

Figure 16:
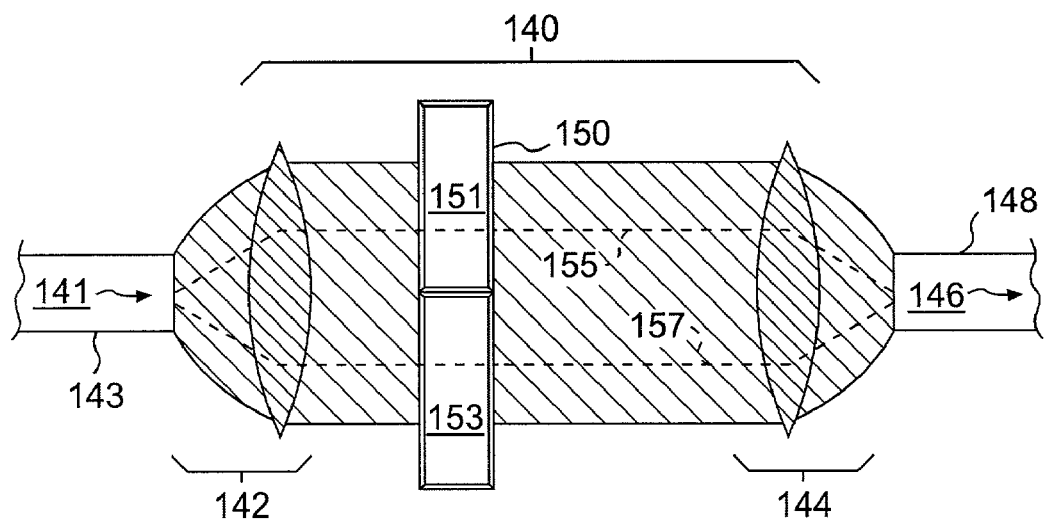
FIG. 16 shows a top planar view of another illustrative filter that is similar to the shown in FIG. 12 except that it includes two lenses for either converging or diverging a beam light in transmission mode, consistent with this invention.

FIG. 16 shows illustrative filter 140. Filter 140 includes optical assembly 142 that receives incident optical signal 141 from input fiber 143, optical assembly 144 for providing filtered optical signal 146 to fiber 148, and plurality 150 of independently tunable filter elements 151 and 153. Elements 151 and 153 are located along different optical paths 155 and 157, respectively, although both paths intersect near the tips of fibers 143 and 148, which can be parts of the assemblies. As described above, each of the filter elements filters a different component of incident optical signal 141 such that, when the components are combined, filtered optical signal 146 is formed.

Thus, consistent with this invention, an optical assembly can include one or more beam shaping or directional elements (i.e., lenses, prisms, diffractive optics, etc.) that direct optical signals between an input or output fiber and filter elements. It will be appreciated, however, that lenses can be used generally to direct, redirect, converge, diverge, or collimate any optical beam or portion thereof, even between a cascade of filter elements.

Thus, during operation consistent with this invention, a beam can be spatially dispersed into at least two different components and directed to at least two respective filter elements (e.g., pixels). Each of the pixels acts like a tunable filter that can be tuned to reject a particular band of frequencies.

Figure 17:
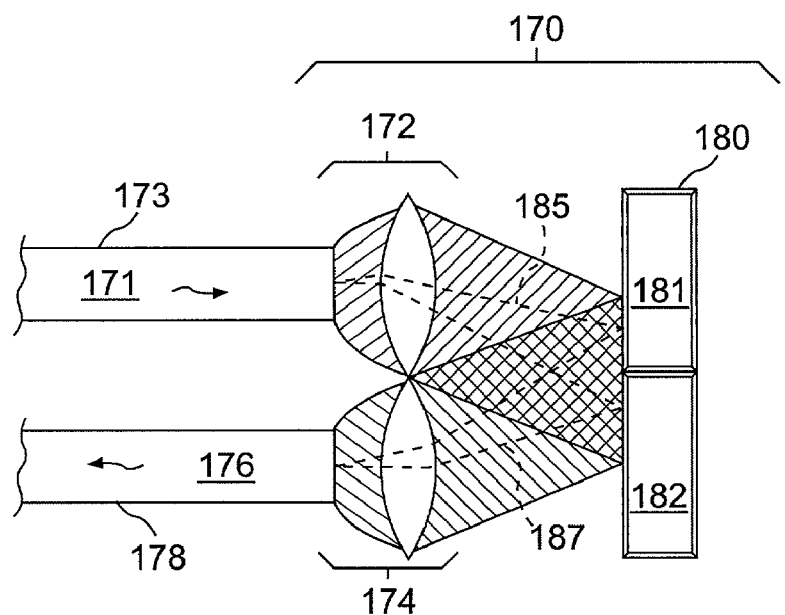
FIG. 17 shows still another filter, which is similar to the filter shown in FIG. 16, except that the filter operates in reflection mode, consistent with this invention.

FIG. 17 shows another illustrative filter 170. Filter 170 is similar to filter 140, except that filter 170 operates in reflection mode while filter 140 operates in transmission mode. Filter 170 includes optical assembly 172 that receives incident optical signal 171 from input fiber 173, optical assembly 174 for providing filtered optical signal 176 to fiber 178, and plurality 180 of independently tunable filter elements 181 and 182. Elements 181 and 183 are located along different optical paths 185 and 187, respectively, although both paths intersect near the tips of fibers 173 and 178. It will be appreciated that fibers 173 and 178 can form parts of the assemblies. As described above, each of the filter elements filters a different component of incident optical signal 171 such that, when the components are combined, filtered optical signal 176 is formed at the tip of fiber 178.

Figure 18:
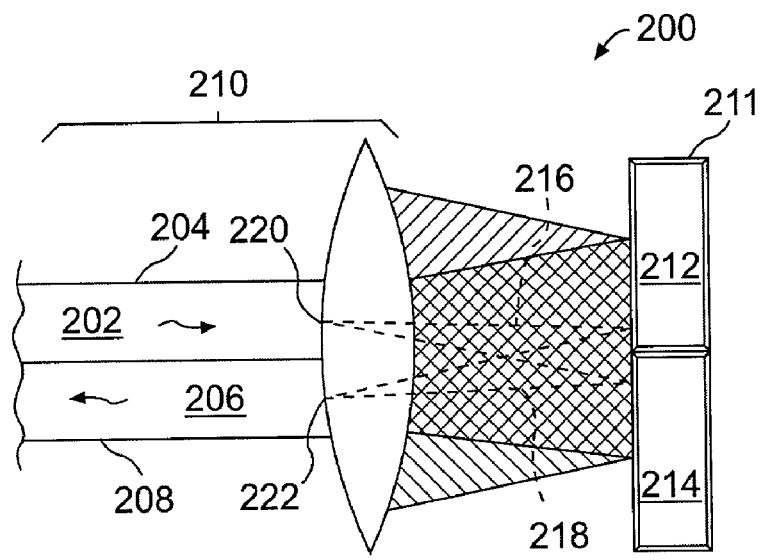
FIG. 18 shows another illustrative filter that includes a dual fiber collimator, consistent with this invention.

FIG. 18 shows another illustrative filter 200 consistent with this invention. Filter 200 includes dual fiber collimator 210 that receives incident optical signal 202 from input fiber 204 and that provides filtered optical signal 206 to fiber 208, and plurality 211 of independently tunable filter elements 212 and 214. Elements 212 and 214 are located along different optical paths 216 and 218, respectively, although both paths intersect near fiber tips 220 and 222. As described above, each of filter elements 212 and 214 filters a different component of incident optical signal 202 such that, when the components are combined, filtered optical signal 206 is formed, in this case, at fiber tip 222.

Figure 19:
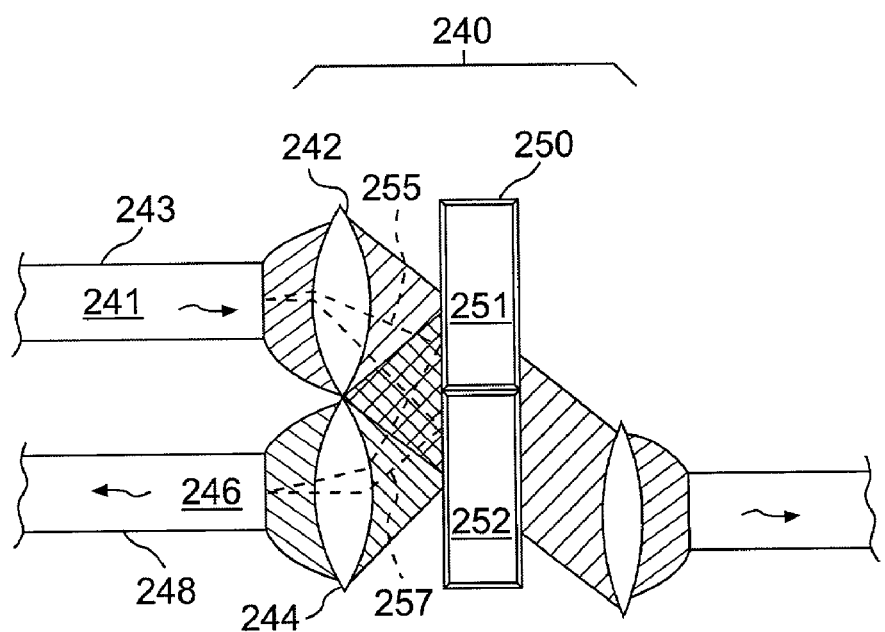
FIG. 19 shows still another illustrative filter that can operate in both reflection mode and transmission mode simultaneously, consistent with this invention.

FIG. 19 shows another illustrative filter 240 consistent with this invention that can operate in both reflection mode and transmission mode simultaneously. Filter 240 includes optical assembly 242 (e.g., a lens) that receives incident optical signal 241 from input fiber 243, optical assembly 244 (e.g., another lens) that provides filtered optical signal 246 to fiber 248, and plurality 250 of independently tunable filter elements 251 and 252. Elements 251 and 252 are located along different optical paths 255 and 257, respectively, although both paths intersect near the tips of fibers 243 and 248. As described above, each of the filter elements filters a different component of incident optical signal 241 such that, when the components are combined, filtered optical signal 246 is formed. As described more fully below with respect to other embodiments, additional input and output ports (e.g., fibers) can be added to a filter consistent with this invention.

According to another aspect of this invention, polarization diversity can be used to perform polarization-independent spectral filtering. FIGS. 20–23 shows four illustrative embodiments of polarization diversity-based spectral filters consistent with this invention.

Figure 20:
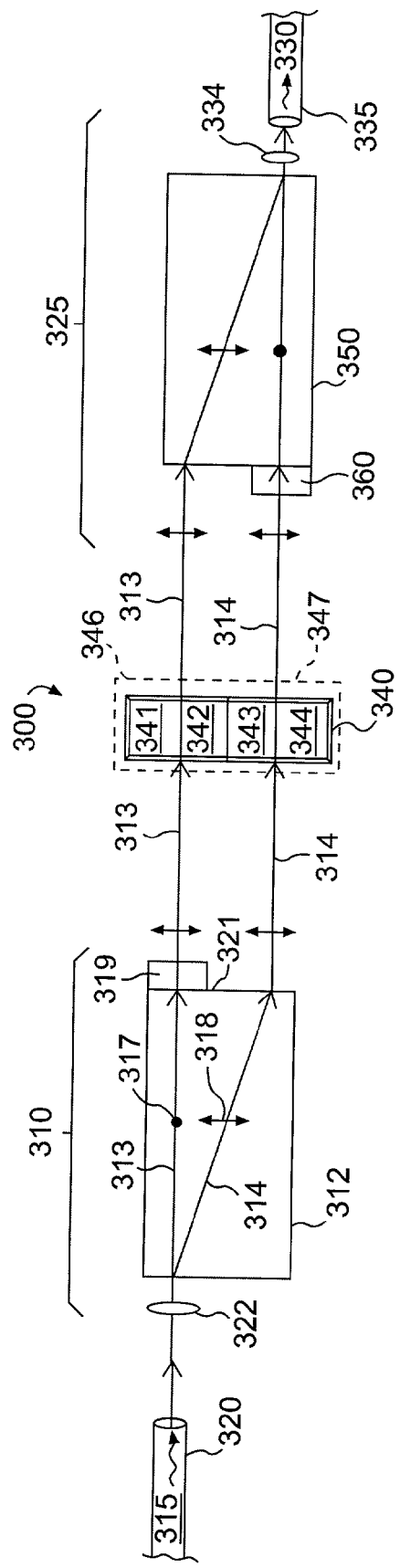
FIG. 20 shows still another illustrative filter that includes beam walk-off crystals for splitting and reuniting a beam's orthogonal polarization components, consistent with this invention.

FIG. 20 shows illustrative filter 300. Filter 300 includes optical assembly 310 that receives incident optical signal 315 from input fiber 320, optical assembly 325 that collects and provides filtered optical signal 330 to fiber 335, and plurality 340 of independently tunable filter elements 341–344. Each of filter elements 341–344 is located along a different optical path, although all paths share a common starting point and a common ending point—they all diverge from and converge toward fibers 320 and 335, respectively.

Optical assembly 310 can include a polarization beam splitting component, such as beam walk-off crystal 312, for dividing incident signal 315 into orthogonal polarization components 313 and 314. Within crystal 312, component 313 has polarization direction 317 pointing in and out of FIG. 20 and component 314 has polarization direction 318 that lies within the plane of FIG. 20. Although beam walk-off crystal 312 can simply be a birefringent crystal, other types of polarization beam splitting components that can be used consistent with this invention include Brewter angle, Rochon, and Wollaston prisms, etc.

When component 314 reaches end 321 of crystal 312, component 314 is directed toward and incident upon filter set 347, which includes filter elements 343 and 344. If filter elements 343 and 344 are filled with a liquid crystal, for example, then the directors of the liquid crystals are preferably aligned with the polarization direction of the beam being filtered. It is known that such alignment will maximize tunability of the beam as it propagates through the liquid crystal without changing the polarization of the light. It will be appreciated that when component 314 exits crystal 312, the polarization direction remains within the plane of FIG. 18.

The length of a crystal 312 is preferably sufficiently long such that the two polarization components do not overlap when they reach the end of the crystal. When a walk-off crystal is made from $YVO_4$, for example, the two components will separate by a maximum distance that is approximately one tenth of the crystal's length. Thus, if the incident beam diameter is 1 mm and the length of the crystal is 15 mm, two polarization beam components will have their centers separated by 1.5 mm, which is sufficient to avoid overlap of the polarization components.

In contrast, when component 313 reaches end 321 of crystal 312, beam 313 passes through half-wave wave plate 319. Wave plate 319 rotates polarization direction 317 so that it has a polarization direction that is essentially the same as component 314. It will be appreciated that half-wave wave plate 319 is optional. When wave plate 319 is present in filter 300, both sets 346 and 347 of filter elements can have liquid crystal directors pointed in the same direction, which simplifies the manufacture of the constituent filter elements.

Once portions of components 313 and 314 have been transmitted through sets 346 and 347, respectively, those components have been individually filtered and can now be combined to form a composite filtered optical signal. Combining, or merging, these components can be achieved in the same way that the components were originally divided—namely, with another beam walk-off crystal 350 and half-wave wave plate 360. Once again, components 313 and 314 have orthogonal polarization components while traveling through beam walk-off crystal 350 and, hence, do not interfere with one another at the convergence point.

It will be appreciated that input beam 315 could be collimated with lens 322 before entering crystal 312. Alternatively, beam 315 can be collimated by fiber 315 itself, if its tip is appropriately shaped. If input beam 315 is so collimated, filtered beam 330 will also be collimated when it emerges from crystal 350. Thus, lens 334 can be added after crystal 350 (or fiber 335 tip can be shaped) to focus beam 330 into fiber 335.

It will be further appreciated that sets 346 and 347 preferably perform the same spectral filtering function. In this way, both polarization components are filtered in the same way, making the filter polarization independent.

As explained above, transmitted portions of polarization components 313 and 314 are ultimately collected by fiber 335. Reflected portions of these components can also be collected and directed to an additional output fiber. In a geometry similar to FIG. 17, two physically separate fibers can be used, or in a geometry similar to FIG. 18, a dual fiber collimator can be used.

Figure 21:
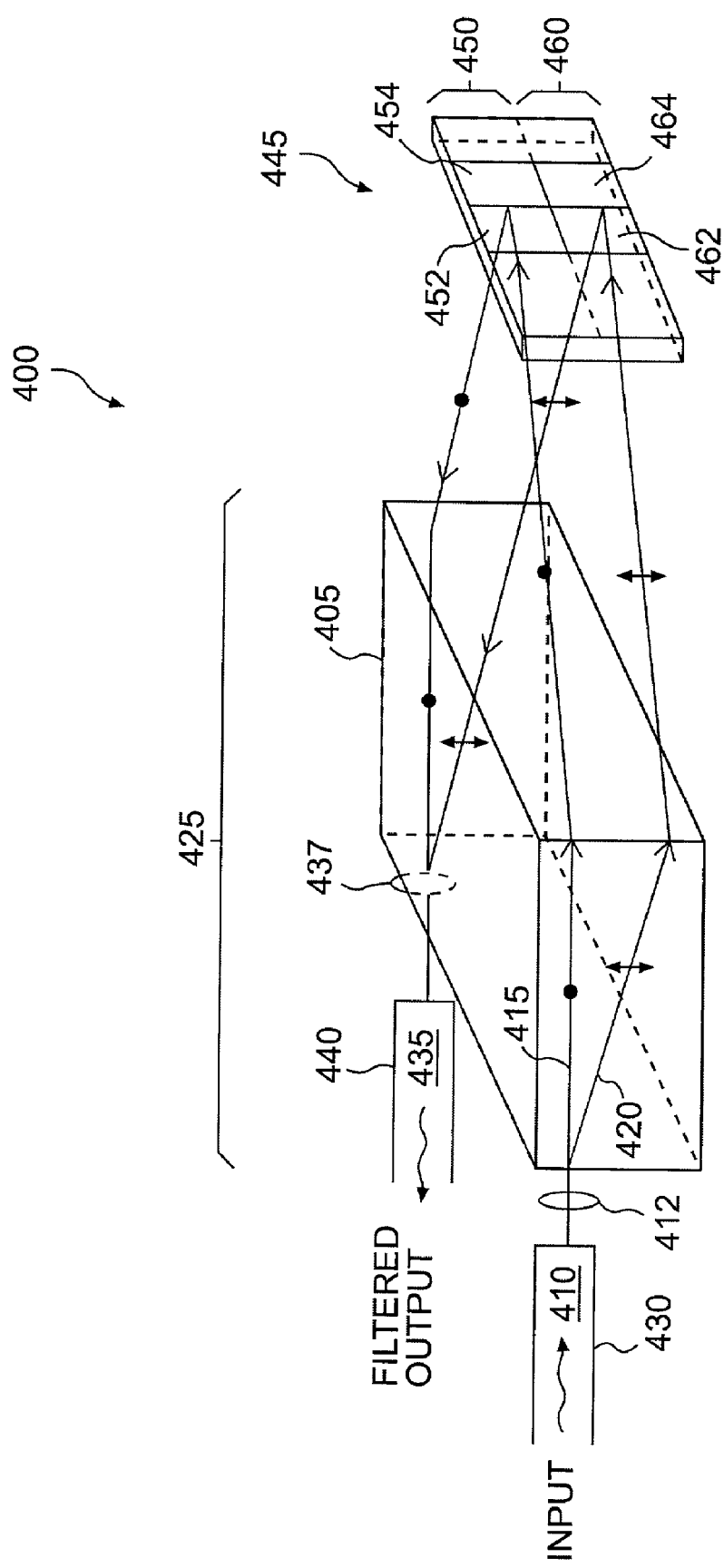
FIG. 21 shows a further illustrative filter that operates in reflection mode and leverages a polarization diversity scheme, consistent with this invention.

For example, FIG. 21 shows another illustrative filter 400 consistent with this invention that operates in reflection mode and leverages a polarization diversity scheme. Filter 400 is similar to filter 170 of FIG. 17, except that filter 400 includes beam walk-off crystal 405 that divides input beam 410 into orthogonal polarization components 415 and 420 and merges the components after they are each filtered in reflection mode by at least two sets of filter elements 450 and 460.

Thus, filter 400 includes optical assembly 425 and plurality 445 of filter elements. Optical assembly 425 receives incident optical signal 410 from input fiber 430 (via optional lens 412) and provides filtered beam 435 to output fiber 440 (via optional lens 437, which may be the same as lens 412). Set 450 includes at least two independently tunable filter elements 452 and 454. Similarly, set 460 includes at least two independently tunable filter elements 462 and 464. If each of elements 452, 454, 462, and 464 is filled with liquid crystal, then it will be appreciated that the directors of those liquid crystals are preferably aligned with the polarization directions of the respective incident beams. In this way, each of the filter elements can be tuned over the broadest possible range when a voltage is applied to the element. It will be further appreciated, however, that the filter elements need not include liquid crystals and could be, for example, MEMS devices, which are generally not polarization sensitive and need not use polarization diversity schemes.

Also, for illustrative simplicity, although components 415 and 420 only appear to be incident on a respective boundary between a pair of filter elements, it will be appreciated that component 415 is incident on at least filter elements 452 and 454 and component 420 is incident on at least elements 462 and 464. This illustrative simplification was also applied to FIGS. 20 and 21.

Figure 22:
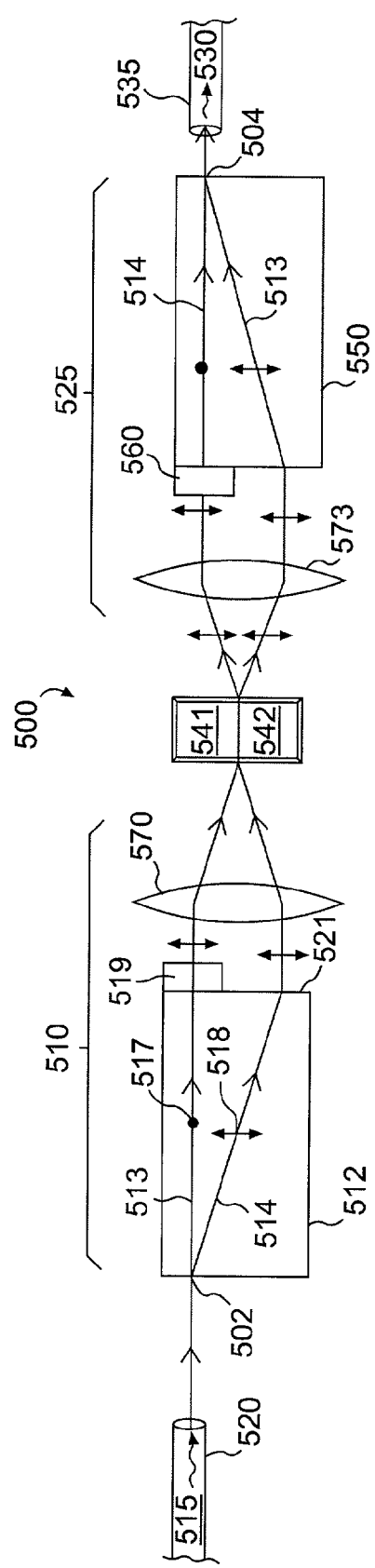
FIG. 22 shows another illustrative filter that includes a beam walk-off crystal, operates in reflection mode, and only uses one set of filter elements, consistent with this invention.
Figure 23:
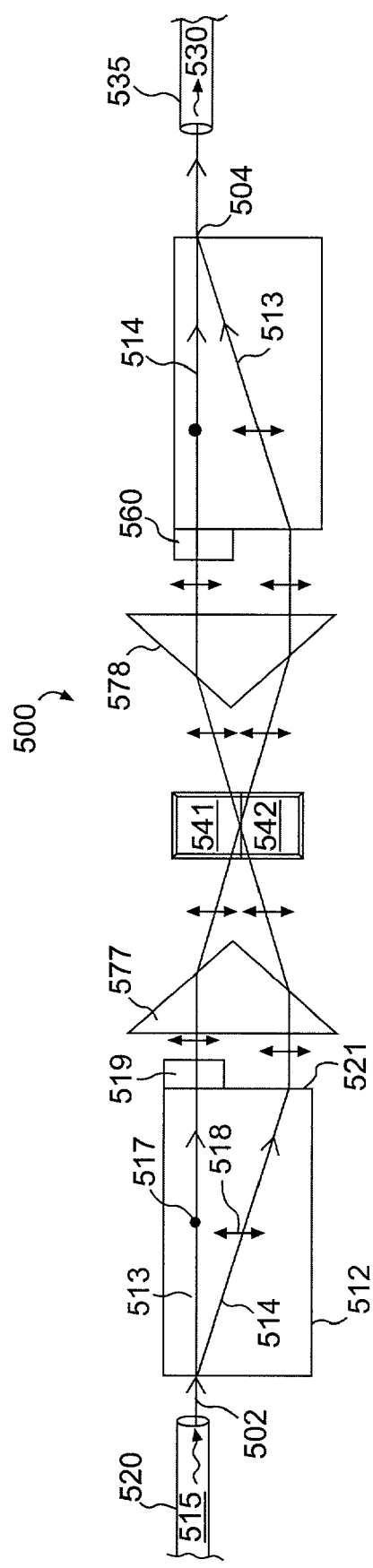
FIG. 23 shows another illustrative filter that is nearly identical to the filter shown in FIG. 22, except that the prisms of FIG. 22 have been substituted for lenses, consistent with this invention.

Moreover, although polarization components 415 and 420 are directed to two different sets of filter elements, two half-wave rotators (e.g., half-wave wave plates) can be placed between the walk-off crystal and the filter elements in a manner shown in FIGS. 20, 22, and 23. A single set of filter elements can be used to filter both polarization components. This "single set" technique is illustrated in FIG. 22. This technique simultaneously filters two polarization components that have been changed from orthogonal to parallel before they are filtered, and then made orthogonal once more after they are filtered.

FIG. 22 shows filter 500, which includes optical assembly 510 for receiving incident optical signal 515 from input fiber 520, optical assembly 525 that provides filtered optical signal 530 to fiber 535, and at least two independently tunable filter elements 541 and 542.

Optical assembly 510 includes beam walk-off crystal 512 for dividing an incident beam into orthogonal polarization components 513 and 514. As shown in FIG. 22, components 513 and 514 have polarization directions 517 and 518, respectively, that are orthogonal within beam walk-off crystal 512.

Like in filter 300 shown in FIG. 20, when component 513 reaches end 521 of crystal 512, beam 513 passes through half-wave wave plate 519, which rotates the polarization direction of component 513—causing it to have the same polarization direction as component 514. When wave plate 519 is present in filter 500, filter elements 541 and 542 can each have liquid crystal directors that are pointed in the same direction, which simplifies the manufacture of the constituent filter elements.

Assembly 510 can further include lens 570, which directs polarization components 513 and 514 toward a single set of filter elements (e.g., elements 541 and 542). Although lens 570 is optional, its presence along the optical paths of component 513 and 514 directs both components 513 and 514 toward the single set of filter elements.

The use of a single set of filter elements is possible because both components 513 and 514 have essentially the same polarization direction (e.g., parallel to the plane of FIG. 22) when they enter the set of filter elements. As mentioned above, when filter elements consistent with this invention include liquid crystals, those liquid crystals should have directors that are substantially parallel to the polarization direction of the incident beam. When two more beams pass through the same set of filter elements, the directors of those filter elements should be substantially parallel to the polarization directions of the incident beams. Thus, it will be appreciated that by rotating beam 513 by half-wave wave plate 519 (or alternatively beam 514), beams 513 and 514 have polarization directions that are substantially parallel to the directors (not shown) of filter elements 541 and 542. Also, by using a single set of filter elements for both polarization components, fewer filter elements are required to perform the same filtering function.

Polarization independent filtering can also be achieved using a method shown by Patel, which is hereby incorporated by reference in its entirety. As discussed above, Patel's dual-polarization liquid crystal etalon filter includes a nematic liquid crystal in a Fabry-Perot cavity. The crystal is divided into two portions that are buffed in orthogonal directions so that they align the liquid crystal parallel to their surfaces. Using a polarization beam diversity scheme, an input beam is split into its orthogonal polarization components and both portions of the Fabry-Perot cavity operate in equal amounts upon the components to induce a polarization independent filter.

Thus, according to another aspect of this invention, a dual-polarization liquid crystal etalon, as shown by Patel, can be used to perform polarization-independent filtering, if desired. In this case, each filter element consistent with this invention (e.g., elements 101 and 103 of FIG. 12, elements 121 and 123 of FIG. 14, elements 151 and 513 of FIG. 16, etc.) can each have a polarization beam splitter and two liquid crystal portions buffed in orthogonal directions.

Returning to FIG. 22, once portions of components 513 and 514 have been filtered by elements 541 and 542, those portions can be made parallel by lens 573 and then combined to form composite filtered beam 530. Combining these components can be achieved in the same way that the components were originally divided—namely, with another beam walk-off crystal 550 and half-wave wave plate 560. FIG. 23 shows another filter, which is nearly identical to filter 500 of FIG. 22, except that prisms 577 and 578 have been substituted for lenses 570 and 573. Operationally, both filters are identical.

Figure 24:
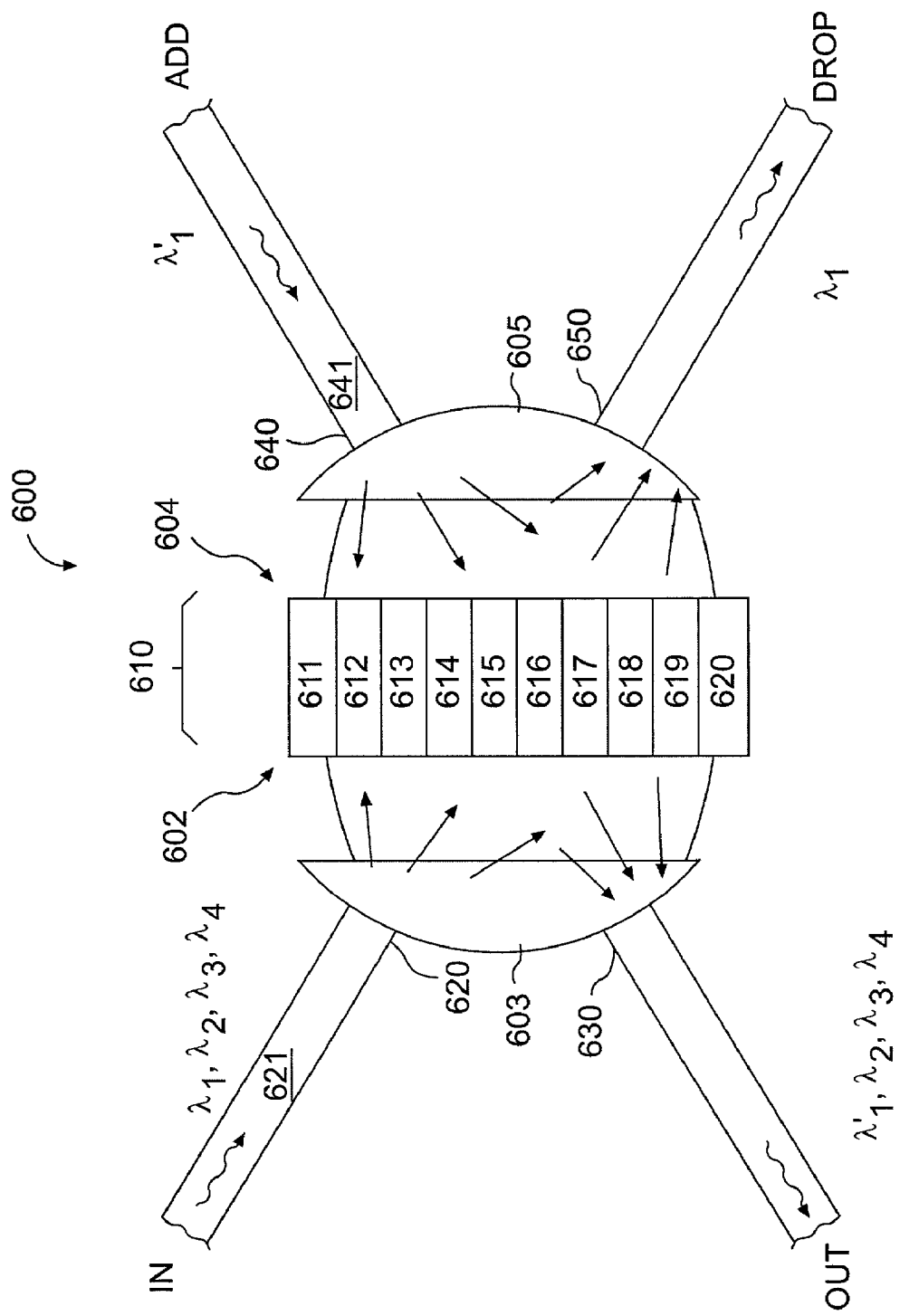
FIG. 24 shows illustrative add/drop optical multiplexing device, consistent with this invention.

FIG. 24 shows illustrative add/drop optical multiplexing device 600. Such a device is often the primary component device of a SONET network, and is often used to drop individual wavelengths onto a first fiber and pass through remaining wavelengths to a different fiber. Such a device can also add certain wavelengths, which are usually the same as the dropped wavelengths, but carry local traffic. Moreover, such a device can also be complemented by a digital cross connect, which mediates between SONET channels as they traverse the network, and in some cases can groom traffic down to the DS-1/DS-3 level.

Device 600 includes at least one set 610 of filter elements 611–620. The number of filter elements consistent with this invention can be greater or less than the number shown, but must be at least two. Also, although the filter elements are shown as a one-dimensional array, it will be appreciated that two or more one-dimensional arrays can be combined to form a two-dimensional array or combined to form a cascade of arrays. Device 600 also includes multiple optical ports, such as input port 620, output port 630, add port 640, and drop port 650.

During operation, optical input signal 621 is provided via port 620 to side 602 of set 610 of filter elements 611–620. Input signal 621 can include, for example, one or more optical channels $\lambda_1$, $\lambda_2$, $\lambda_3$, and $\lambda_4$. Each of these channels can be a discrete wavelength or a band of wavelengths. Also, optical add signal 641 is provided via port 640 to side 604 of set 610. Signal 641 can include, for example, optical channel $\lambda_1'$. In accordance with this invention, filter elements 611–620 can be individually tuned such that they substantially transmit $\lambda_1$ and $\lambda_1'$, yet reflect $\lambda_2$, $\lambda_3$, and $\lambda_4$. As shown in FIG. 24, this causes optical channels $\lambda_1'$, $\lambda_2$, $\lambda_3$, and $\lambda_4$ to be transmitted to output port 630 and optical channel $\lambda_1$ to be transmitted (i.e., dropped from signal 621) to output port 650. It will be appreciated that by tuning each of elements 611–620 to perform a predetermined spectral filtering function consistent with this invention, device 600 can be used to selectively add or drop one or more optical channels. Further add and drop ports can be added to device 600, if desired.

It will be appreciated that optional lenses 603 and 605 have been added to appropriately direct the incident, transmitted, and reflected beams. It will also be appreciated that the exact location and orientation of the ports depends on whether the device is operated in transmission or reflection mode and whether additional optical components, such as lenses, prisms, and/or mirrors are used. Polarization diversity can also be applied to device 600 to make such a device polarization insensitive, such as by including a beam walk-off crystal.

Figure 25:
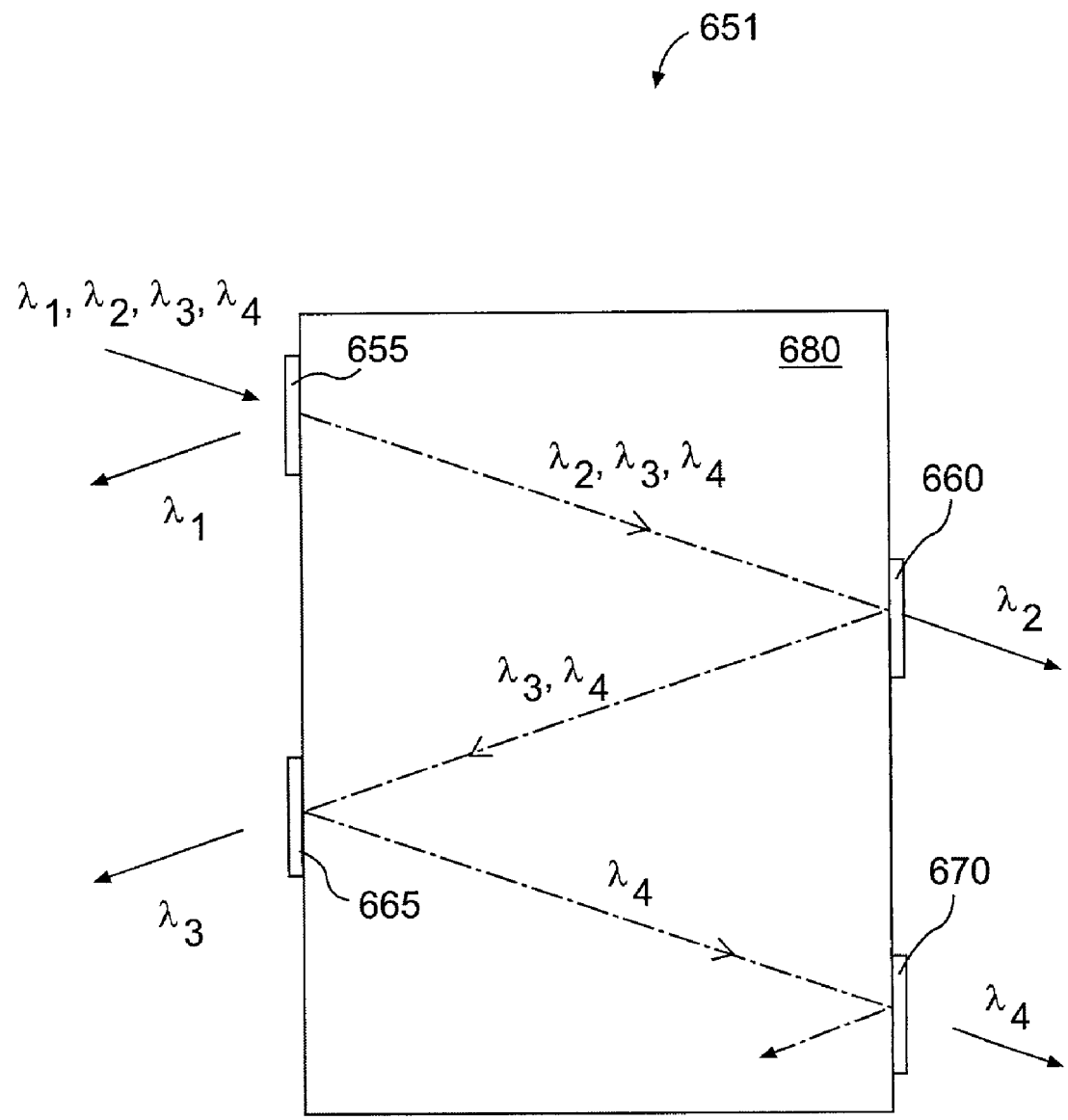
FIG. 25 shows an optical branch filter, consistent with this invention.

Multiple filters constructed consistent with this invention can also be combined and used to construct optical branch filters. FIG. 25, for example, shows optical branch filter 651, which includes filters 655, 660, 665, and 670, and structure 680 on which the filters are mounted. During operation a wavelength multiplexed optical beam, which may contain a number of optical channels (e.g., at wavelengths $\lambda_1$, $\lambda_2$, $\lambda_3$, and $\lambda_4$), is directed to filter 655. If filter 655 is tuned to transmit wavelengths $\lambda_2$, $\lambda_3$, and $\lambda_4$ and reflect wavelength $\lambda_1$, only optical channels at wavelengths $\lambda_2$, $\lambda_3$, and $\lambda_4$ will reach filter 660. If filter 660 is tuned to transmit wavelength $\lambda_2$ and reflect wavelengths $\lambda_3$ and $\lambda_4$, only optical channels at wavelengths $\lambda_3$ and $\lambda_4$ will reach filter 665. Finally, if filter 665 is tuned to transmit wavelength $\lambda_3$ and reflect wavelength $\lambda_4$, only one optical channel at wavelengths $\lambda_4$ will reach filter 670.

It will be appreciated that each of filters 655, 660, 665, and 670 can be tuned consistent with this invention to filter one or more wavelengths and that the number of filters can be any number greater than one. Finally, structure 680 can be empty or solid, as long as light beams pass through it with relatively low loss.

Figure 26:
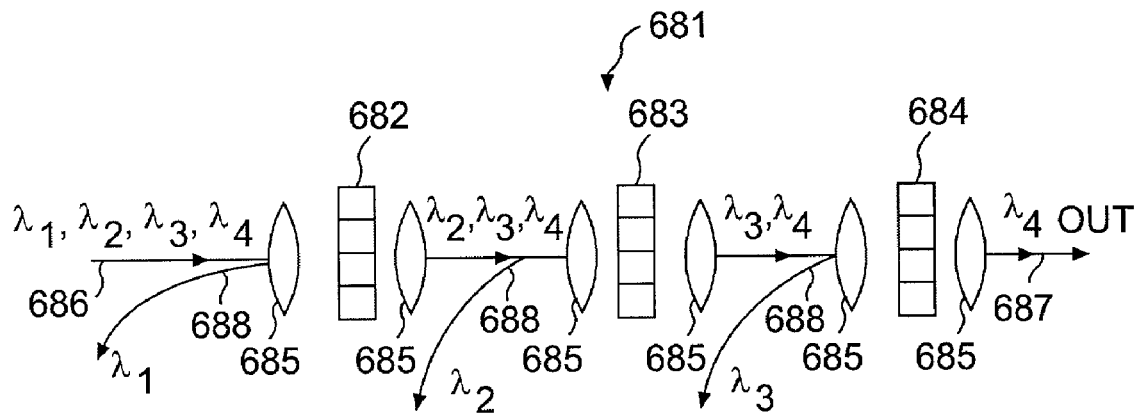
FIG. 26 shows another illustrative optical multiplexing device, consistent with this invention.

FIG. 26 shows another simplified multiplexing/demultiplexing device 681 consistent with this invention. Device 681 includes a cascade filters in which the main part of an optical beam is transmitted from stage to stage. Device 681 includes multiple sets of filter elements 682, 683, and 684. The number of filter elements in each set consistent with this invention can be greater or less than the number shown (i.e., four), but must be at least two and can be arranged in a multi-dimensional array. Like device 600, device 681 also includes multiple optical ports, including input port 686, output port 687, and multiple drop ports 688.

During operation, a wavelength multiplexed optical beam, which may contain a number of optical channels (e.g., at wavelengths $\lambda_1$, $\lambda_2$, $\lambda_3$, and $\lambda_4$), is directed to filter 682. If filter 682 is tuned to transmit wavelengths $\lambda_2$, $\lambda_3$, and $\lambda_4$ and reflect wavelength $\lambda_1$, only optical channels at wavelengths $\lambda_2$, $\lambda_3$, and $\lambda_4$ will reach filter 683. If filter 683 is tuned to reflect wavelength $\lambda_2$ and transmit wavelengths $\lambda_3$ and $\lambda_4$, only optical channels at wavelengths $\lambda_3$ and $\lambda_4$ will reach filter 684. Finally, if filter 684 is tuned to reflect wavelength $\lambda_3$ and transmit wavelength $\lambda_4$, only one optical channel at wavelengths $\lambda_4$ will reach output port 687.

Figure 27:
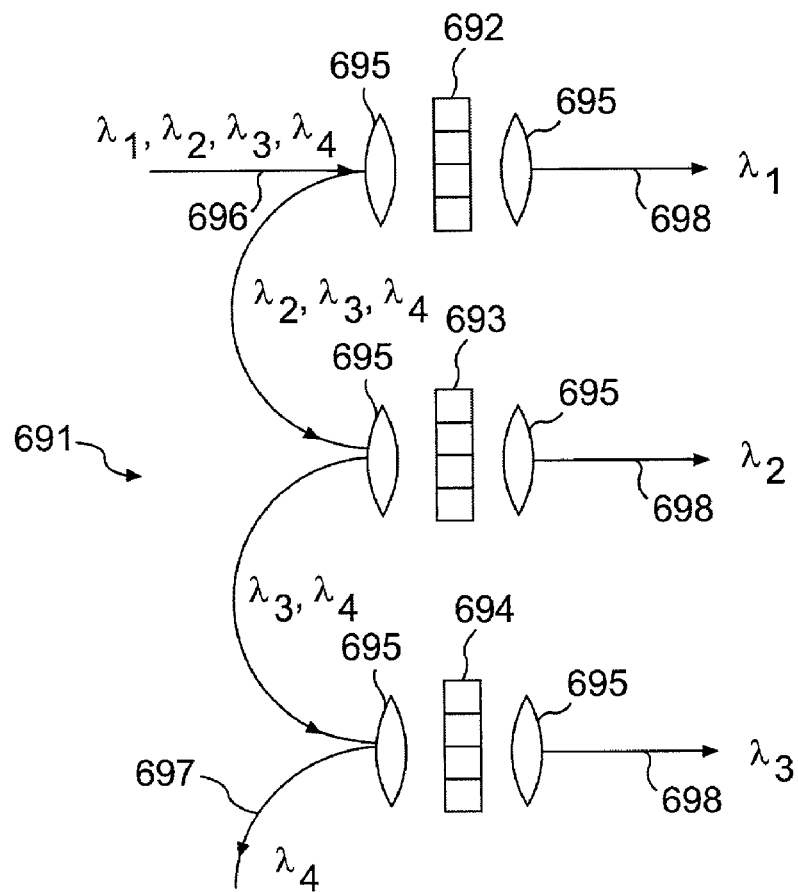
FIG. 27 shows yet another illustrative multiplexing device, consistent with this invention.

FIG. 27 shows yet another simplified illustrative multiplexing device 691 consistent with this invention. Device 691 includes a cascade filters in which the main part of an optical beam is reflected from stage to stage. Device 691 includes multiple sets of filter elements 692, 693, and 694. Like devices 600 and 681, device 691 also includes multiple optical ports, including input port 696, output port 697, and multiple drop ports 698. During operation, a wavelength multiplexed optical beam, which may contain a number of optical channels (e.g., at wavelengths $\lambda_1$, $\lambda_2$, $\lambda_3$, and $\lambda_4$), is directed to filter 692. If filter 692 is tuned to reflect wavelengths $\lambda_2$, $\lambda_3$, and $\lambda_4$ and transmit wavelength $\lambda_1$, only optical channels at wavelengths $\lambda_2$, $\lambda_3$, and $\lambda_4$ will reach filter 693. If filter 693 is tuned to transmit wavelength $\lambda_2$ and reflect wavelengths $\lambda_3$ and $\lambda_4$, only optical channels at wavelengths $\lambda_3$ and $\lambda_4$ will reach filter 694. Finally, if filter 694 is tuned to reflect wavelength $\lambda_3$ and transmit wavelength $\lambda_4$, only one optical channel at wavelengths $\lambda_4$ will reach output port 697.

The devices shown FIGS. 26 and 27 also include optional lenses 685 and 695, respectively, to collect and either focus or collimate light. Furthermore, a polarization diversity scheme, such as the ones shown in FIGS. 20–23, can be used with devices 681 and 691 consistent with this invention. Also, it will be appreciated that a hybrid of the devices shown in FIGS. 26 and 27, in which the main part of the beam is reflected by some filters and transmitted by other filters, can be constructed consistent with this invention. Moreover, it will be appreciated that each of the stages shown in FIGS. 26 and 27 can be modified (e.g., as shown in FIG. 24) to add channels to the main beam as well.

Figure 28:
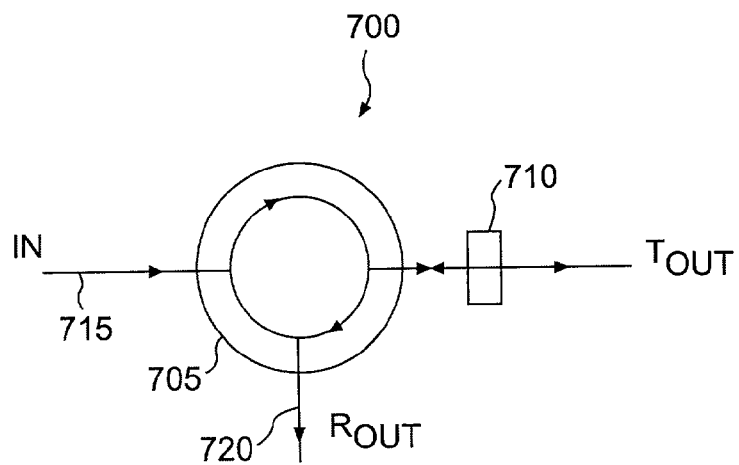
FIG. 28 shows an illustrative device that includes a circulator, consistent with this invention.

FIG. 28 shows a simplified schematic of illustrative filtering device 700. Device 700 includes circulator 705 and set 710 of filter elements consistent with this invention. During operation, input beam 715 is provided to an input of circulator 705. Circulator 705 receives beam 715 and transmits it to filter element set 710. Reflected portion $R_{out}$ of beam 715 reflects from set 710, reenters circulator 705, and emerges at output 720. Also, transmitted portion $T_{out}$ of beam 715 is transmitted through set 710 and emerges at output 720. The wavelengths and relative intensities of portions $R_{out}$ and $T_{out}$ will depend on the particular reflectance/transmittance spectra of set 710.

Figure 29:
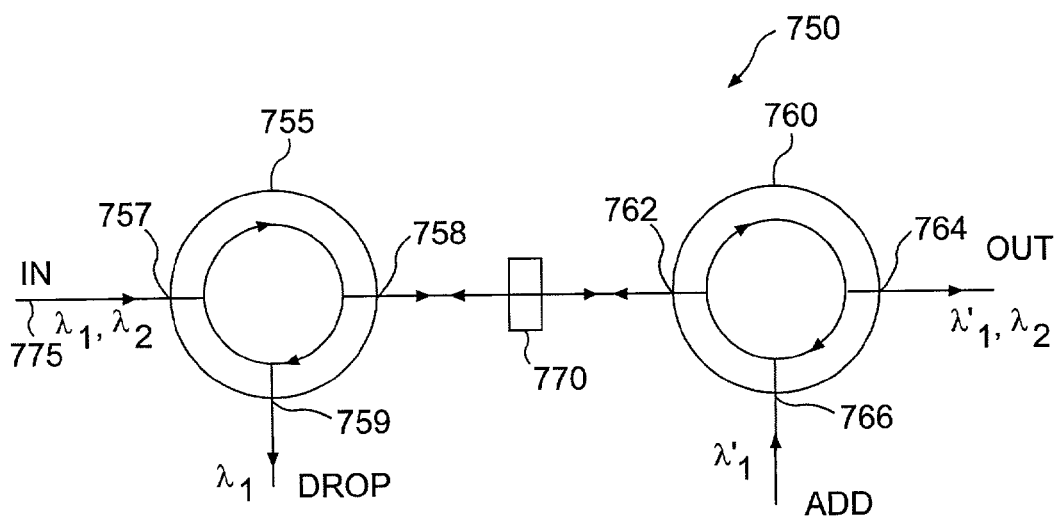
FIG. 29 shows another illustrative device that includes two circulators, consistent with this invention.

FIG. 29 shows another illustrative add/drop multiplexing device 750 that includes multiple circulators consistent with this invention. Device 750 includes circulators 755 and 760, and set 770 of filter elements. During operation, input beam 775, which can be wavelength multiplexed (e.g., including optical signals at wavelengths $\lambda_1$ and $\lambda_2$), is provided to input 757 of circulator 755. Circulator 755 receives beam 775 and transmits it to filter element set 770 via port 758. If set 770 is tuned to transmit optical signals at wavelength $\lambda_2$ and reflect at $\lambda_1$, then optical signal $\lambda_1$ will reenter circulator 755 at port 758 and emerge at drop port 759.

Transmitted signal $\lambda_2$, however, will pass through to circulator 760 via port 762 and emerge at port 764. So far, operation of device 750 is similar to device 700. When another beam 775, which could include signal $\lambda_1'$, is provided to port 766 of circulator 760, circulator 760 transmits it to filter element set 770 via port 762. Because set 770 is tuned to reflect signals having wavelength $\lambda_1$, optical signal $\lambda_1'$ will be reflected from filter set 770 and reenter circulator 760 at port 762 and emerge at port 764, along with transmitted signal $\lambda_2$. In this way, it can be seen that signal $\lambda_1$ is dropped and signal $\lambda_1'$ is added to input beam 775.

According to another aspect of the present invention, a dynamic gain equalizer can be constructed. It is known that the intensity level of an optical signal propagating along an optical fiber can depend on the particular optical wavelength, unequalized optical amplification, and other wavelength dependent effects. Thus, an optical signal can strikes a light detector at an intensity level that occasionally saturates the detector or at an intensity level that is below the detector's optimal threshold level that ensures error-free detection. This fluctuation also limits the number of optical amplifiers that can be used in the optical transmission line, which limits the distance of the link. Thus, a dynamic attenuator consistent with this invention can be used to vary the intensity of a light beam within an acceptable operational range without undesirable variations in the spatial, temporal, spectral, or polarization variation effects.

Thus, a dynamic gain equalizer can be constructed consistent with this invention that includes a plurality of filter elements (e.g., an etalon that includes an array of independently tunable filter elements), wherein each of the elements is located along a different optical path, although these optical paths may cross one or more times. During operation, light is incident on multiple filter elements and optical transmittances (or alternatively, reflectances) of the elements can be separately varied by varying electric fields (i.e., AC electric fields) applied to the liquid crystals. Of course, any optically, electrically, or mechanically active material can also be used consistent with this invention to vary an individual filter element's transmittance.

As mentioned above, a dynamic gain equalizer can be constructed with a Fabry-Perot etalon. The etalon can have any desirable gap thickness, such as between 1 and 10 microns. A gap that is about 5 microns filled with a liquid crystal, for example, has proven to be satisfactory. The etalon can be divided into a sufficient number of pixels to achieve the desired level of smoothness, and preferably has a total surface area that is larger than the incident beam. If, for example, a beam has a diameter of 1 mm, and a pixel has a width of 100 microns, then an array of at least ten pixels are necessary, assuming minimal dead space between pixels. Thus, larger beam diameters will require larger pixel sizes or larger numbers of pixels.

An equalizer consistent with this invention can be programmed to vary the number of filter elements that either transmit or reflect at a particular wavelength, vary the actual shape of each individual filter element's wavelength dependent reflectance to design any desirable filter function (or, when the filter element is a Gires-Tornouis etalon, the phase), or a combination of both. This wavelength-agile filter is capable of dynamically equalizing the power of dense WDM (hereinafter, "DWDM") channels to provide active compensation of inherent optical amplifier gain variations due to weak and strong routed signals. A dynamic equalizer constructed consistent with this invention can be operated in conjunction with an optical spectral power detector, such as in an optical spectrum analyzer.

Other types of optical devices can be constructed consistent with this invention, including optical cross connects and switchable optical filter.

A wavelength switchable filter, for example, can be constructed as shown in FIG. 15 or 19, but it will be appreciated that other multi-port architectures can also be used. For example, FIG. 15 shows filter 160, which includes a plurality of independently tunable filter elements 161 and 162. As previously described, each filter element filters a different component of incident optical signal 167 such that, when the components are combined, filtered optical signal 168 is formed in reflection mode and filtered optical signal 169 is formed in transmission mode.

Filter 160 can be used as a switch by abruptly changing its transmittance at the desired switching wavelength. Thus, when filter 160 has a high transmittance $T_\lambda$ at wavelength $\lambda$, it also has reflectance $R_\lambda$ at the same wavelength. Because $R_\lambda$ is equal to $T_\lambda-1$, one can switch an optical beam's path between fibers 192 and 191 by simply changing the transmittance between low (i.e., T=0) and high (i.e., T=1) values.

It can be seen from FIG. 15, then, that a first component of incident beam 167 travels along path 163 during which time a portion of that beam may be reflected by filter element 161 and redirected to fiber 191 to partially form filtered reflected beam 168. Similarly, a different portion of the first component of incident beam 167 can travel through element 161 and be transmitted along path 193 to output fiber 192 to partially form filtered transmitted beam 169.

In an identical fashion, a second component of incident beam 167 travels along path 164 during which time a portion of that beam may be reflected by filter element 162 and redirected to fiber 191 to partially form filtered beam 168. Similarly, a different portion of the second component of incident beam 167 may travel through element 162 and be transmitted along path 194 to output fiber 192 to partially form filtered beam 169.

In addition to the switch described above, a modulator can be constructed consistent with this invention. A modulator is typically a device that is capable of rapidly changing its transmittance or reflectance, sometimes in a polarization dependent way, between high and low values (i.e., 0 and 1) for one or more wavelengths. It will be appreciated, then, that a filter consistent with this invention can be used to modulate an optical signal by modulating one or more filter elements between two states.

In a similar fashion, a filter consistent with this invention can be used as an optical blocking filter. By selectively increasing or decreasing the reflectance or transmittance, respectively, at one or more wavelengths, one can selectively block these wavelengths.

It will be appreciated that filter elements can also be made from micro-electromechanical and micro-optoelectromechanical (sometimes referred to as MEMS and MOEMS, respectively) devices, which can be controlled to vary the distance between two reflectors. For example, gratings and other wavelength sensitive devices can be made with these micromechanical devices, which could be used to construct filter elements consistent with this invention. It will also be appreciated that bubbles and other hybrid technologies, such as those that integrate MEMS-based optical switches with liquid crystals can also be used to construct dynamic interference filters consistent with this invention.

Figure 30:
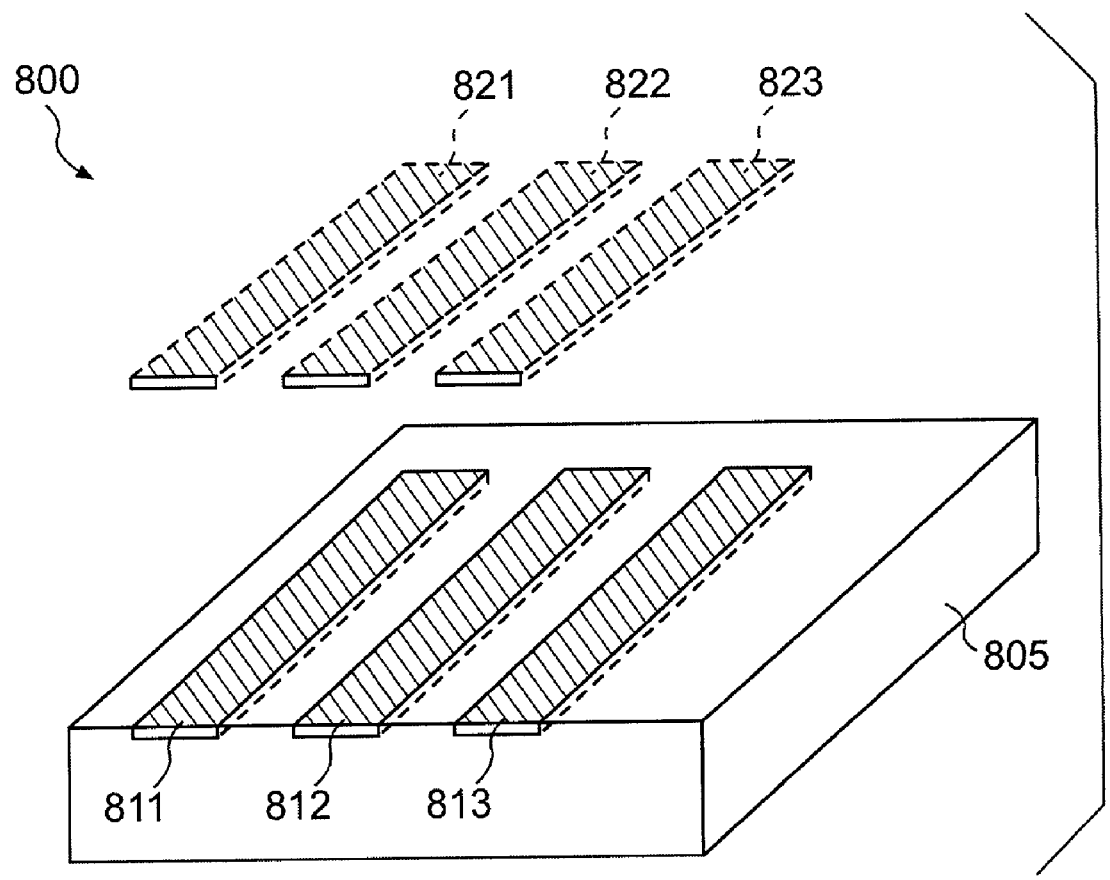
FIG. 30 shows a simplified, exploded, perspective view of a micro-electromechanical (hereinafter, "MEMS") type device consistent with this invention.

FIG. 30 shows a simplified, exploded, perspective view of MEMS-type device 800 consistent with this invention. Device 800 includes at least a lower array of reflectors 811–813, and an upper array of reflectors 821–824, all of which can be formed using any conventional MEMS construction technique, such as an etching or photolithographic technique. The lower and upper arrays form upper and lower pairs with gaps, and each of the reflectors can be formed monolithically on the same substrate, or separately and then combined to form a hybrid device. For illustrative simplicity, and the large number of possible physical configurations, the upper array of reflectors is not shown as fixed to substrate 805 or anything else. However, both arrays of reflectors are normally fixed to some support structure, such as substrate 805. Also, although only three pairs of reflectors are shown in FIG. 30, it will be appreciated that a filter consistent with this invention can include any number of reflector pairs, each of which forms a filter element.

In either case, one or both reflectors of any given pair can be movable such that the distance between the pair is variable. If the reflectors are electrically conductive, they can be used as electrodes that, when charged, causes one or both of the reflectors to move due to an electro-static force that may form between the reflectors. If the reflectors are not electrically conductive, an electrically conductive layer can be disposed on the reflectors to enable electro-mechanical gap distance control. Also, because filter elements constructed using MEMS are typically polarization independent, polarization diversity techniques need not be employed.

One skilled in the art will appreciate that the present invention can be practiced by other than the described embodiments, which are presented for purposes of illustration and not of limitation, and that the present invention is limited only by the claims that follow.

We claim:
1. A tunable optical filter comprising:
   a first optical assembly for receiving an incident optical beam and for dividing said incident optical beam into a plurality of spatially separated component beams, each of which is directed along a different optical path;
   a second optical assembly for providing a filtered optical beam; and
   a plurality of independently tunable filter elements, wherein each of said elements is located along a different one of said optical paths, wherein each of said paths passes through said first and second assemblies, and wherein each of said filter elements filters a different one of said plurality of spatially separated component beams such that, when said spatially separated component beams are combined, said filtered optical beam is formed.

2. The filter of claim 1 wherein at least one of said filter elements can operate in a mode selected from a group consisting of a reflection mode, a transmission mode, and a simultaneous combination thereof.

3. The filter of claim 1 wherein said first and second optical assemblies form a composite assembly that comprises a dual fiber collimator.

4. The filter of claim 1 wherein said first optical assembly comprises at least one lens for directing at least a portion of said incident optical beam between said first optical assembly and at least one of said plurality of filter elements.

5. The filter of claim 1 wherein said first optical assembly comprises at least one lens for directing at least a portion of said incident optical beam between an optical fiber and at least one of said plurality of filter elements.

6. The filter of claim 1 wherein said first optical assembly comprises a first beam walk-off crystal for dividing said incident optical beam into a first polarization component and a second polarization component, wherein said first polarization component passes to a first set of said filtering elements, and wherein said second polarization component passes to a second set of said filtering elements, wherein said first and second sets each comprises at least two of said filtering elements.

7. The filter of claim 6 wherein said first and second sets of filter elements perform substantially the same filtering function.

8. The filter of claim 7 wherein said filtering function is essentially the same with respect to wavelength.

9. The filter of claim 6 wherein said second optical assembly comprises a second beam walk-off crystal for merging at least a first portion of said first polarization component and a first portion of said second polarization component after said components pass to said sets of filter elements.

10. The filter of claim 9 wherein said first beam walk-off crystal is located such that said first crystal merges a second portion of said first component and a second portion of said second component after said components pass to said sets of elements.

11. The filter of claim 6 wherein said first beam walk-off crystal is located such that said first crystal merges a first portion of said first component and a first portion of said second component after said components pass to said sets of elements.

12. The filter of claim 11 wherein said incident optical beam is input to said filter by an input fiber and wherein said filter further comprises a lens between said fiber and said beam walk-off crystal.

13. The filter of claim 12 wherein said filtered optical beam is provided to an output by an output fiber and wherein said filter further comprises a lens between said output fiber and said walk-off crystal.

14. The filter of claim 6 wherein said first optical assembly further comprises a dual fiber collimator, said collimator comprising a first fiber, a second fiber, and a lens, wherein said lens: (1) collimates and directs said incident optical beam to said first beam walk-off crystal and (2) focuses and directs said components from said first beam walk-off crystal after said components are passed to said sets of elements.

15. The filter of claim 6 wherein said first optical assembly also comprises:
a half-wave wave plate located between said first beam walk-off crystal and said first set of filtering elements, such that when said first polarization component emerges from said wave plate, both of said polarization components have substantially the same polarization state.

16. The filter of claim 15 wherein said first and second sets of filter elements perform substantially the same filtering function.

17. The filter of claim 16 wherein said filtering function is essentially the same with respect to wavelength.

18. The filter of claim 15 wherein said second optical assembly comprises:
a second beam walk-off crystal for merging said first polarization component and said second polarization component after said components pass to said filtering elements; and
a second half-wave wave plate located between said second beam walk-off crystal and said one of said sets of filtering elements such that before said polarization component enter said second beam walk-off crystal, said components have substantially orthogonal polarization states.

19. The filter of claim 1 wherein said first optical assembly comprises:
a first beam walk-off crystal for dividing said incident optical beam into a first polarization component and a second polarization component, wherein said first and second polarization components pass to a set of at least two of said filtering elements; and
a first half-wave wave plate located between said first beam walk-off crystal and said set of filtering elements such that when said first polarization component emerges from said first wave plate both of said polarization components have substantially the same polarization state.

20. The filter of claim 19 wherein said first optical assembly further comprises an optical element selected from a group consisting of a lens and a prism, said optical element being located between said beam walk-off crystal and said set of filtering elements.

21. The filter of claim 20 wherein said second optical assembly comprises:
a second beam walk-off crystal for merging said first polarization component and said second polarization component after said components pass to said filtering elements; and
a second half-wave wave plate located between said second beam walk-off crystal and said set of filtering elements such that before said components enter said second beam walk-off crystal, said components have substantially orthogonal polarization states.

22. The filter of claim 1 further comprising at least one additional port selected from a group consisting of an additional input and an additional output.

23. The filter of claim 1 wherein said plurality of filter elements comprises a plurality of Fabry-Perot filter elements.

24. The filter of claim 23 wherein each of said filter elements comprises:
a first substantially planar reflector;
a second substantially planar reflector that is substantially parallel to said first reflector and that forms a gap between said reflectors, and wherein each of said reflectors has substantially the same reflectance over a predetermined spectral band;
a liquid crystal located in said gap; and
a pair of electrodes located on opposite sides of said liquid crystal.

25. The filter of claim 24 wherein each of said filter elements has a FSR that is at least as wide as said predetermined spectral band.

26. The filter of claim 25 wherein said filter has a spectral shape, said plurality of filter elements comprises a number of filter elements, and wherein said number and said reflectance can be chosen to select said shape.

27. The filter of claim 24 such that when no potential difference is applied any of said pairs of electrodes, said filter is tuned to a wavelength that is outside said spectral band and all wavelengths within said band are substantially reflected.

28. The filter of claim 24 wherein said reflectors and said electrodes are the same.

29. The filter of claim 1 wherein said plurality of filter elements comprises a plurality of Gires-Tornouis filter elements.

30. The filter of claim 29 wherein each of said filter elements comprises:
   a first substantially planar reflector having a first reflection coefficient that is less than 1.0 over a predetermined spectral band;
   a second substantially planar reflector having a second reflection coefficient that is about 1.0 over said predetermined spectral band, said reflectors being substantially parallel to each other and forming a gap therebetween;
   a liquid crystal located in said gap; and
   a pair of electrodes located on opposite sides of said liquid crystal.

31. The filter of claim 30 wherein each of said filter elements has a FSR that is at least as wide as said predetermined spectral band.

32. The filter of claim 30 such that when no potential difference is applied to any of said pairs of electrodes, said filter is tuned to a wavelength that is outside said spectral band and all wavelengths within said band are substantially reflected.

33. The filter of claim 32 wherein said filter has a spectral shape, said plurality of filter elements comprises a number of filter elements, and wherein said number and said reflectance can be chosen to select said shape.

34. The filter of claim 30 wherein said reflectors and said electrodes are the same.

35. The filter of claim 30 wherein said filter can be tuned by varying interference between portions of said incident optical beam that reflect from different filter elements.

36. The filter of claim 35 wherein said varying interference can be achieved by varying a first phase of a first of said filter elements with respect to a second phase of at least a second of said filter elements.

* * * * *

UNITED STATES PATENT AND TRADEMARK OFFICE
CERTIFICATE OF CORRECTION

PATENT NO. : 7,035,484 B2  Page 1 of 1
APPLICATION NO. : 10/120562
DATED : April 25, 2006
INVENTOR(S) : Silberberg et al.

It is certified that error appears in the above-identified patent and that said Letters Patent is hereby corrected as shown below:

In claim 27, column 23, line 9, "applied any" should read --applied to any--.

Signed and Sealed this

Fifteenth Day of August, 2006

JON W. DUDAS
*Director of the United States Patent and Trademark Office*